US012683966B2

(12) United States Patent
Swaminathan

(10) Patent No.: US 12,683,966 B2
(45) Date of Patent: Jul. 14, 2026

(54) CONSOLIDATED DOMAIN MANAGEMENT WITH DNS-ANCHORED AUTHORITY

(71) Applicant: Kishore Swaminathan, Willowbrook, IL (US)

(72) Inventor: Kishore Swaminathan, Willowbrook, IL (US)

( * ) Notice: Subject to any disclaimer, the term of this patent is extended or adjusted under 35 U.S.C. 154(b) by 0 days.

(21) Appl. No.: 19/324,775

(22) Filed: Sep. 10, 2025

(65) Prior Publication Data

US 2026/0012455 A1 Jan. 8, 2026

Related U.S. Application Data

(63) Continuation-in-part of application No. 18/199,965, filed on May 21, 2023, now Pat. No. 12,445,496.

(51) Int. Cl.
H04L 9/40 (2022.01)
(52) U.S. Cl.
CPC ..................................... H04L 63/10 (2013.01)
(58) Field of Classification Search
None
See application file for complete search history.

(56) References Cited

U.S. PATENT DOCUMENTS

| | | | | |
|---|---|---|---|---|
| 8,219,644 | B2 * | 7/2012 | Drako ................. | H04L 61/4511 |
| | | | | 709/219 |
| 8,521,845 | B2 * | 8/2013 | Cartmell ............. | H04L 61/4511 |
| | | | | 709/200 |
| 11,546,319 | B2 * | 1/2023 | Galvin .................... | H04L 63/18 |
| 11,936,757 | B1 * | 3/2024 | Benny ................. | H04L 61/4511 |
| 2012/0011360 | A1 * | 1/2012 | Engels .................... | H04L 9/006 |
| | | | | 380/278 |
| 2020/0084177 | A1 * | 3/2020 | Wu ....................... | H04L 67/1021 |
| 2020/0358789 | A1 * | 11/2020 | Kaliski, Jr. ........... | H04L 63/123 |
| 2021/0289001 | A1 * | 9/2021 | Wilson .................. | H04L 63/101 |
| 2021/0336920 | A1 * | 10/2021 | Chen ................... | H04L 43/0882 |
| 2022/0038504 | A1 * | 2/2022 | Goldstein ............. | H04L 51/212 |
| 2024/0314163 | A1 * | 9/2024 | Gopathy ................ | H04L 51/21 |

\* cited by examiner

*Primary Examiner* — Younes Naji

(57) ABSTRACT

An Internet domain designates a Domain Authority (DA) via a DNS record as a consolidated and trusted entity for collecting, validating, storing, and distributing domain-related information, including devices associated with the domain, services it provides, capabilities it supports, identities acting on its behalf, and policies governing access to its resources. The DA performs cross-category validation to ensure consistency across these information types and may publish information into DNS for compatibility, serve it dynamically through APIs, or deliver it over other secure channels. By inheriting DNS's trust model while replacing its rigid record-based structure with a unified and extensible framework, the DA provides stronger and more flexible management of domain data while enabling incremental deployment of new Internet security and capability features.

20 Claims, 17 Drawing Sheets

Figure 1:
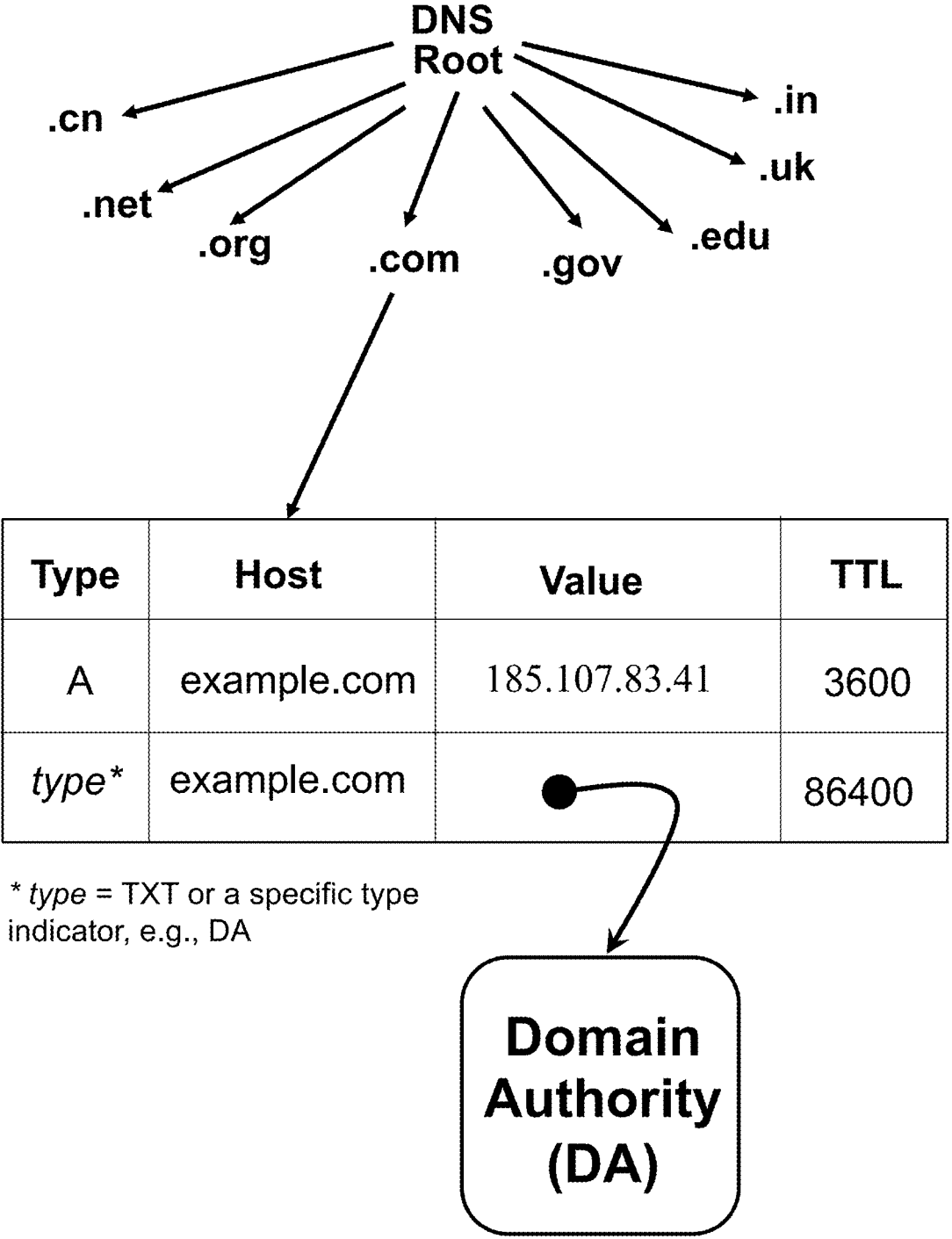

| Type | Host | Value | TTL |
|------|------|-------|-----|
| A | example.com | 185.107.83.41 | 3600 |
| *type** | example.com | ● | 86400 |

* *type* = TXT or a specific type
indicator, e.g., DA

Domain Authority (DA)

| Dimension | Traditional DNS | Domain Authority (DA) |
|---|---|---|
| Data Model | Predefined record types with fixed schemas (A, MX, TXT, SRV, etc.) | Support for multiple categories: devices, services, capabilities, identities, policies |
| Validation Scope | Individual record syntax validation | Cross-category syntax, semantics, and consistency validation |
| Updates | Manual synchronization across separate records | Atomic updates of related configurations |
| Distribution Channels | Single channel through DNS | Multiple channels, including DNS, API, push channels |
| Feature Deployment | Standardization and end-to-end ecosystem support for rollout | Enables incremental adoption via API-first deployment |
| Operational Feedback | Resolver logs only | Integrated usage analytics and telemetry |
| Adoption | Requires standardization and end-to-end support. | Incremental adoption via API-first deployment, followed by evidence-based standardization. |

Fig. 03

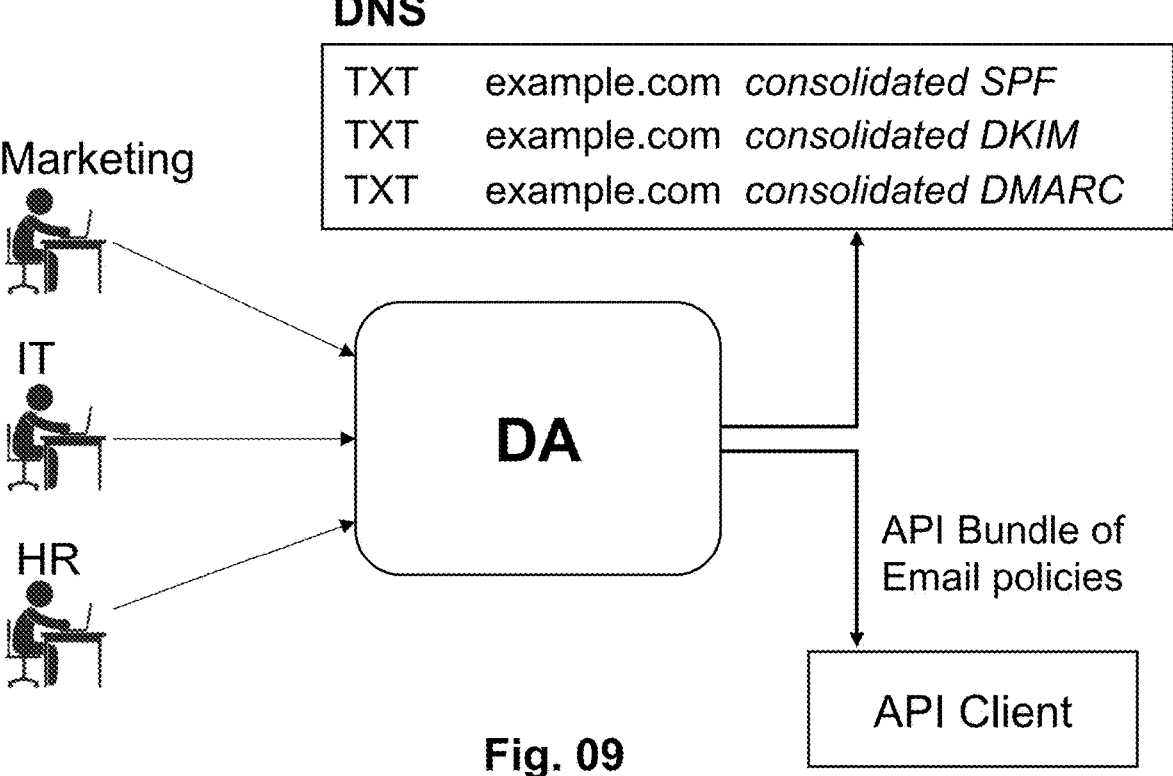

DNS

| TXT | example.com | *consolidated SPF* |
|-----|-------------|---------------------|
| TXT | example.com | *consolidated DKIM* |
| TXT | example.com | *consolidated DMARC* |

Marketing

IT

HR

DA

API Bundle of Email policies

API Client

Fig. 09

| Username | Password | Organization | Role |
|----------|----------|--------------|------|
| kathy@example.com | xxxxxxxx | Internal | sourcer |
| ajay@seo.in | xxxxxxx | seo.in | targeter, policyadmin |
| register@example.com | xxxxxxx, jwt-xxxxx | Internal | registration-bot |

| Role | Privileges |
|------|-----------|
| sourcer | add_user, grant_privileges, delete_privileges |
| targeter | send: address_list={cc_uk_prospects} |
| policyadmin | dmarc_access, server_sourcing |
| registration-bot | EOM-certificate-repo, device-repo-insert, sign-device-ack |

Fig. 10

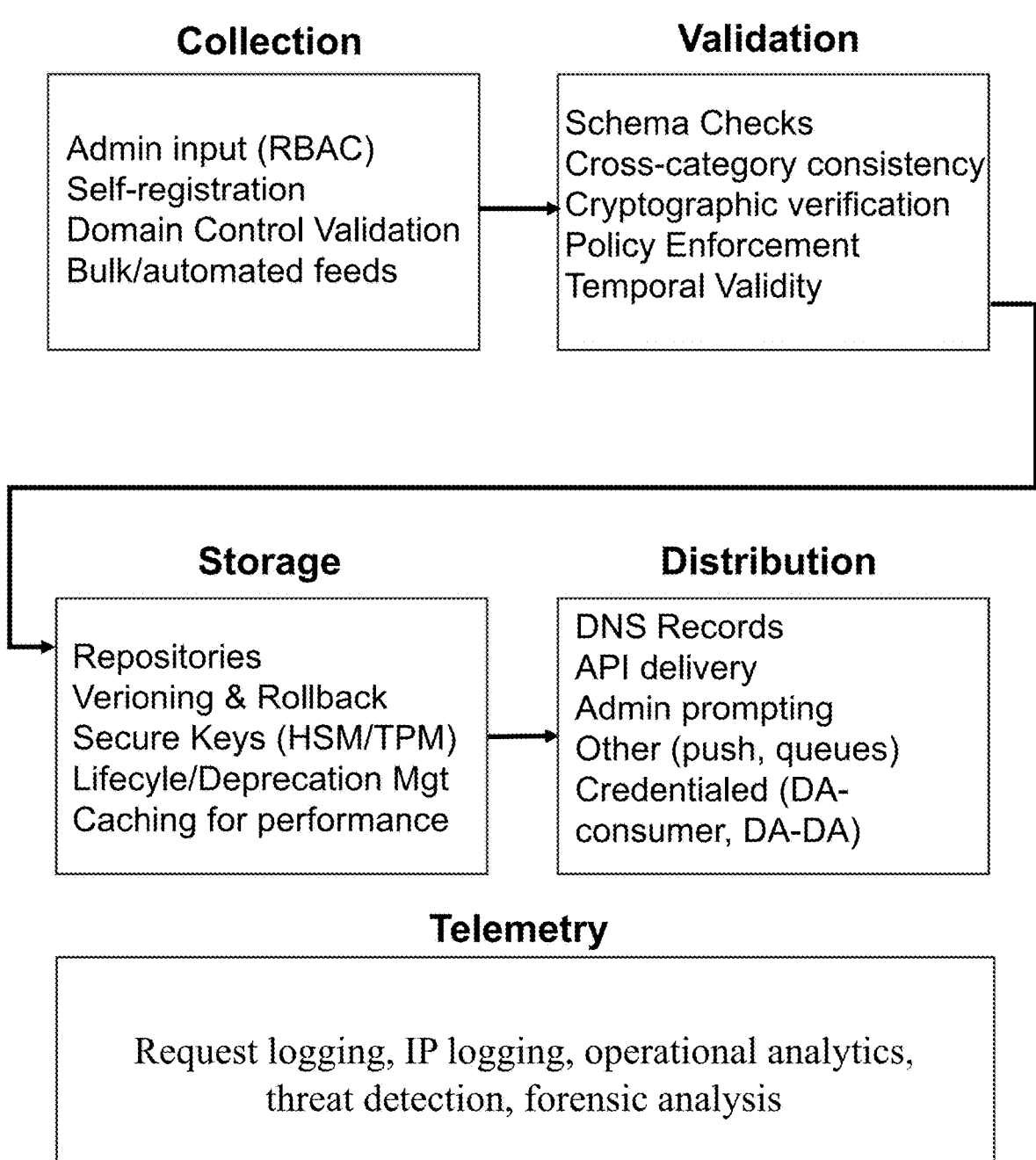

Collection

Admin input (RBAC)
Self-registration
Domain Control Validation
Bulk/automated feeds

Validation

Schema Checks
Cross-category consistency
Cryptographic verification
Policy Enforcement
Temporal Validity

Storage

Repositories
Verioning & Rollback
Secure Keys (HSM/TPM)
Lifecyle/Deprecation Mgt
Caching for performance

Distribution

DNS Records
API delivery
Admin prompting
Other (push, queues)
Credentialed (DA-consumer, DA-DA)

Telemetry

Request logging, IP logging, operational analytics, threat detection, forensic analysis

Fig. 11

| Cartridge | Description |
|---|---|
| Email Authentication | Consolidates SPF, DKIM, DMARC policies with integrated diagnostics and validation. |
| Mail Transport | Manages MTA-STS and DANE/TLSA records for secure SMTP communications. |
| BIMI Branding | Dynamically serves brand logos with geographic and device-aware customization. |
| Messaging | Handles SRV records and API metadata for SIP, XMPP, WebRTC protocols. |
| Abuse/Reporting | Manages RFC 2142 contact addresses (abuse@, postmaster@) with role validation. |
| DNSSEC | Automates KSK/ZSK mgt, key rollover, and signing of information distributed. |
| TLS Certificate | Coordinates TLSA, CAA records with ACME workflows and expiration monitoring. |
| Key Distribution | Securely distributes SSH host keys, API signing keys, and cryptographic material. |
| Device Registration | Handles device self-registration with proof-of-control validation and lifecycle mgt. |
| IoT Fleet | Manages bulk IoT onboarding, compliance metadata, and firmware attestation. |
| Serverless | Coordinates ephemeral function endpoints across cloud platforms with attestation. |
| Load-Balancing | Implements policy-driven traffic distribution and endpoint health monitoring. |
| Service Discovery | Enhanced SRV management with rich API-based service catalogs and metadata. |
| Payment | Advertises payment endpoints with protocol support, currency, and SLA metadata. |
| Authentication | Manages OAuth, SAML, OIDC service discovery with capability negotiation. |
| Compliance Capability | Publishes regulatory compliance declarations (PCI-DSS, HIPAA, SOC2) via APIs. |
| Identity | Manages service accounts, API keys, and automated identity lifecycle. |
| Federation | Coordinates authentication and policies across corporate and subsidiary domains. |
| Machine Identity | Distributes and manages VM, container, and workload certificates. |
| Access Control | Implements zero-trust policies controlling device and service interactions. |
| Compliance | Manages data retention, residency requirements, and regulatory audit hooks. |
| Geo-Policy | Serves region-specific content and endpoints based on geographic policies. |
| Monitoring | Exposes service outages, maintenance schedules, and operational status via APIs. |
| Honeypot | Orchestrates decoy services with integrated monitoring and telemetry. |

Fig. 14

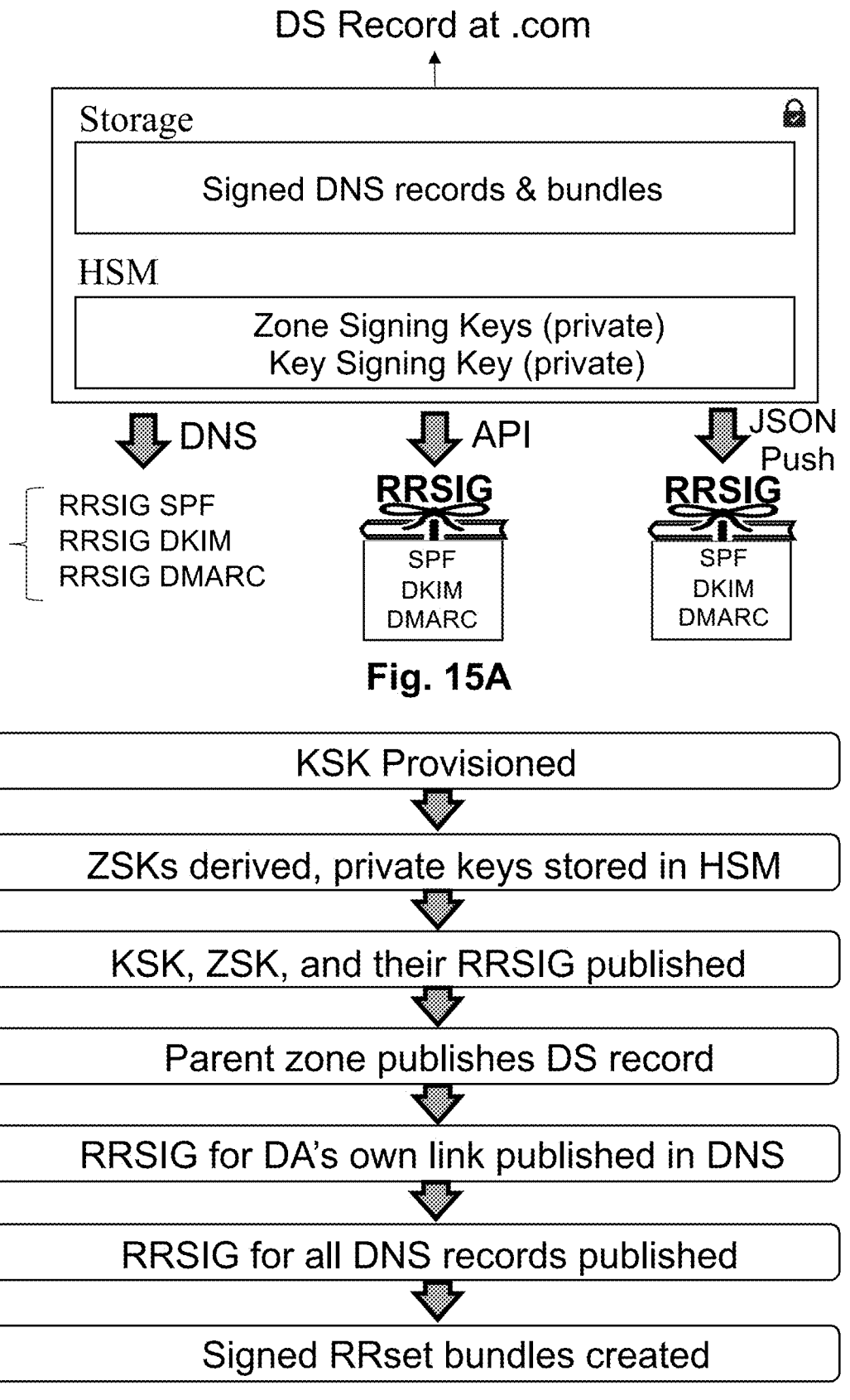

DS Record at .com

Storage 🔒

Signed DNS records & bundles

HSM

Zone Signing Keys (private)
Key Signing Key (private)

⬇ DNS          ⬇ API          ⬇ JSON Push

RRSIG SPF
RRSIG DKIM
RRSIG DMARC

RRSIG
SPF
DKIM
DMARC

RRSIG
SPF
DKIM
DMARC

Fig. 15A

| KSK Provisioned |

⬇

| ZSKs derived, private keys stored in HSM |

⬇

| KSK, ZSK, and their RRSIG published |

⬇

| Parent zone publishes DS record |

⬇

| RRSIG for DA's own link published in DNS |

⬇

| RRSIG for all DNS records published |

⬇

| Signed RRset bundles created |

Fig. 15B

DA Honeypot Monitor

DA of example.com

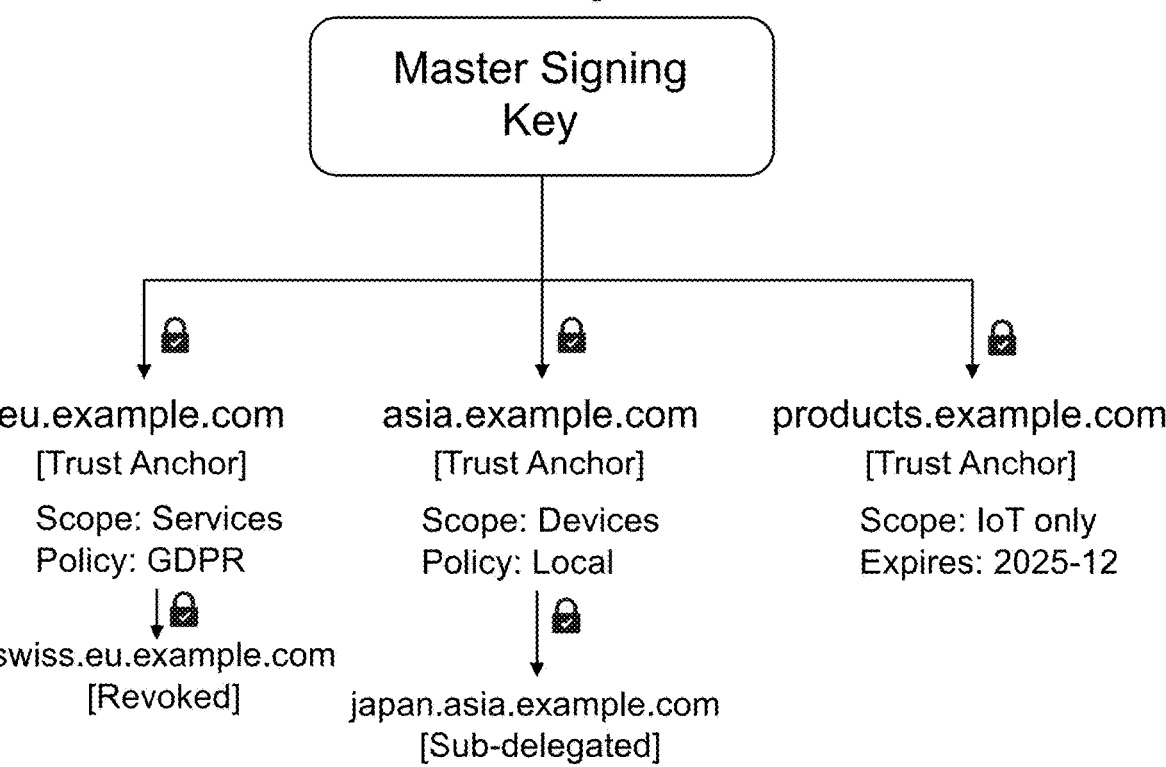

Master Signing Key eu.example.com
[Trust Anchor]

Scope: Services
Policy: GDPR swiss.eu.example.com
[Revoked]

asia.example.com
[Trust Anchor]

Scope: Devices
Policy: Local japan.asia.example.com
[Sub-delegated]

products.example.com
[Trust Anchor]

Scope: IoT only
Expires: 2025-12

Revocation Scenario

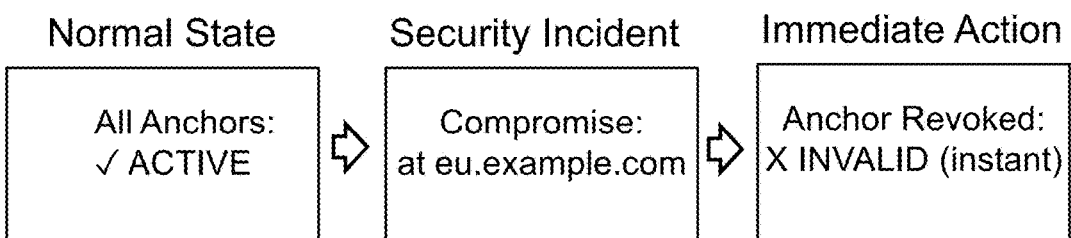

Normal State

All Anchors:
✓ ACTIVE

Security Incident

Compromise:
at eu.example.com

Immediate Action

Anchor Revoked:
X INVALID (instant)

vs. Traditional DNS Delegation w/ NS Records example.com NS eu.example.com
(coarse-grained, unsigned, big TTL delays)

Fig. 20

CONSOLIDATED DOMAIN MANAGEMENT WITH DNS-ANCHORED AUTHORITY

RELATED APPLICATIONS

This application is a continuation-in-part of U.S. patent application Ser. No. 18/199,965, filed May 21, 2023, titled "Enhancing Email Security by Consolidating Email Policy Management," the entirety of which is incorporated herein by reference.

FIELD OF INVENTION

The present invention relates generally to information management in networked environments and specifically to the management of information about Internet domains.

BACKGROUND

The Domain Name System (DNS) is the Internet's core directory, mapping human-readable names to network addresses. DNS is challenging to administer due to its rigid syntax, limited field lengths, and minimal tooling, resulting in frequent misconfigurations. Such errors can lead to outages, security gaps, or the disclosure of sensitive information about infrastructure.

DNS is also static in nature, which limits its usefulness for information that changes frequently, such as Service Location (SRV) records or dynamic service capabilities. Security enhancements, such as DNS Security Extensions (DNSSEC) and encrypted transport protocols like DNS-over-HTTPS (DoH) and DNS-over-TLS (DoT), exist but are rarely deployed. DNSSEC adoption remains at approximately 3-5% of domains worldwide, largely due to the cumbersome and error-prone nature of deployment.

Over time, DNS has accumulated additional uses, such as site-verification tokens and branding records (e.g., BIMI), resulting in complexity and record "bloat."

The present invention describes a Domain Authority (DA): a consolidated entity designated by an Internet domain via a DNS record to serve as the authoritative source for managing domain-related information, including devices, services, capabilities, identities, and policies. The DA consolidates information traditionally scattered across multiple DNS records under a single, DNS-anchored authority, providing a centralized mechanism for the deployment and incremental adoption of new security and capability features without requiring wholesale protocol changes.

This application is a continuation-in-part of U.S. patent application Ser. No. 18/199,965, filed May 10, 2023, titled "Enhancing Email Security by Consolidating Email Policy Management," which described a consolidated policy entity—designated by the domain via a DNS record—for collecting and distributing policies associated with that domain, illustrating the policy entity through a Domain Email Authority (DEA) for managing email-related policies. The present application generalizes this concept to encompass comprehensive domain management beyond policies alone.

BRIEF DESCRIPTION

The invention provides for a system and method in which an Internet domain designates, via a Domain Name System (DNS) record, a Domain Authority (DA) as the authoritative entity for managing domain-related information. The DA consolidates the collection, validation, storage, monitoring, and distribution of such information, which may include data about devices linked to the domain, services it provides, capabilities it offers, identities acting on its behalf, and policies governing access to domain resources.

Devices may include servers, virtual machines, or IoT devices whose configuration and status are managed through the DA. Services may include email, authentication endpoints, payment gateways, or messaging platforms. Capabilities may include supported protocols such as Session Initiation Protocol (SIP) for voice, or Open Authentication (OAuth) for authentication. Identities may include human users, service accounts, or machine credentials. Policies may encompass requirements such as Mail Transfer Agent-Strict Transport Security (MTA-STS) for secure email delivery, access control rules, or branding specifications.

The DA may publish information into the DNS for compatibility, serve it dynamically via Application Programming Interfaces (APIs), or deliver it over other secure channels. In some embodiments, the DA is provisioned with DNS Security Extensions (DNSSEC) keys to digitally sign information, enabling recipients to verify the authenticity and integrity of the delivered information. By consolidating this information behind a single DNS-designated link (see FIG. 01), the DA reduces DNS fanout, streamlines record management, and supports incremental adoption of new features. For example, a new policy may first be distributed via the DA's API to capable endpoints, while legacy systems continue to rely on DNS records. As adoption increases, the DA can publish the policy in both formats and eventually phase out the legacy version.

Figure 2:
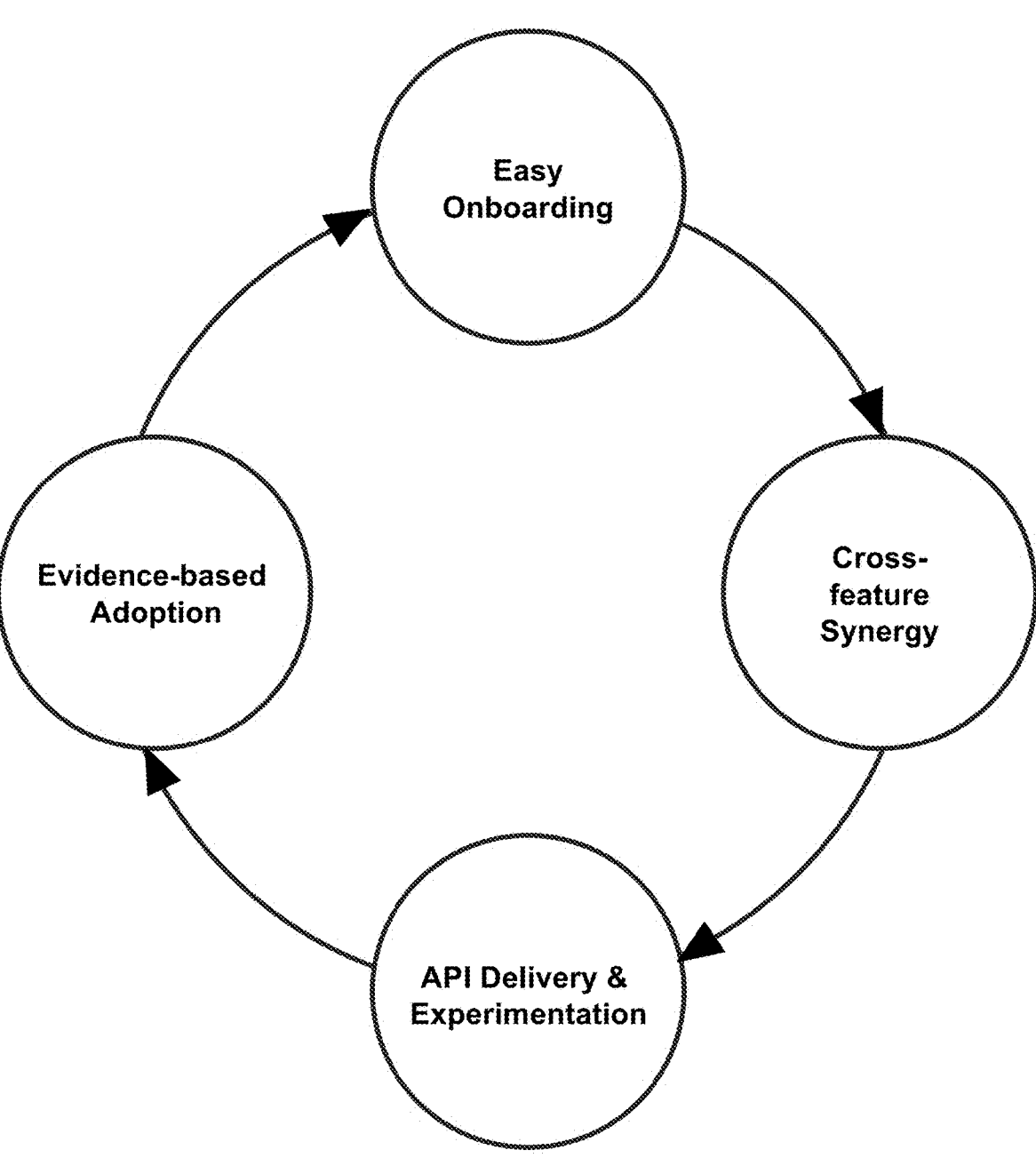

This model addresses DNS clutter caused by ad hoc record types, improves security through consistent validation and signing, and establishes a positive feedback loop for Internet feature adoption as shown in FIG. 02. The DA enables incremental rollout through a repeating cycle of easy onboarding (e.g., preconfigured DNSSEC keys or baseline policies), cross-feature reinforcement (e.g., DNSSEC securing all subsequent records), API-based experimentation without ecosystem-wide changes, and telemetry-driven evidence of effectiveness. This cycle lowers barriers for future domains, accelerates deployment of advanced features, and promotes faster modernization of the Internet as a whole.

LIST OF FIGURES

FIG. 01: A pictorial depiction of how the Domain Authority fits within a DNS.

FIG. 02: A pictorial depiction of the virtuous cycle that the DA enables.

FIG. 03: A table comparing the DA with the DNS.

Figure 4:
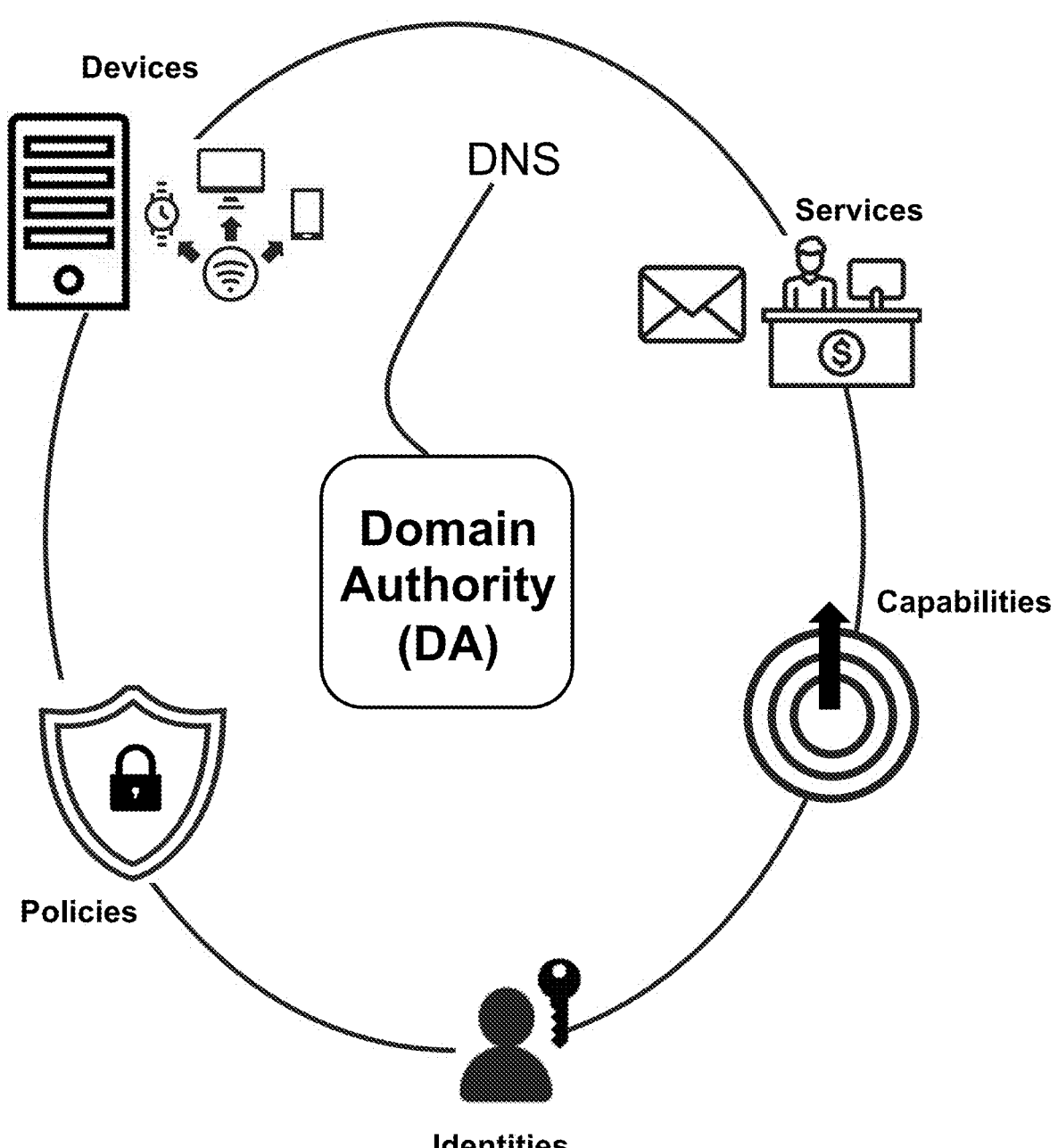

FIG. 04: A high-level overview of a DA embodiment.

Figure 5:
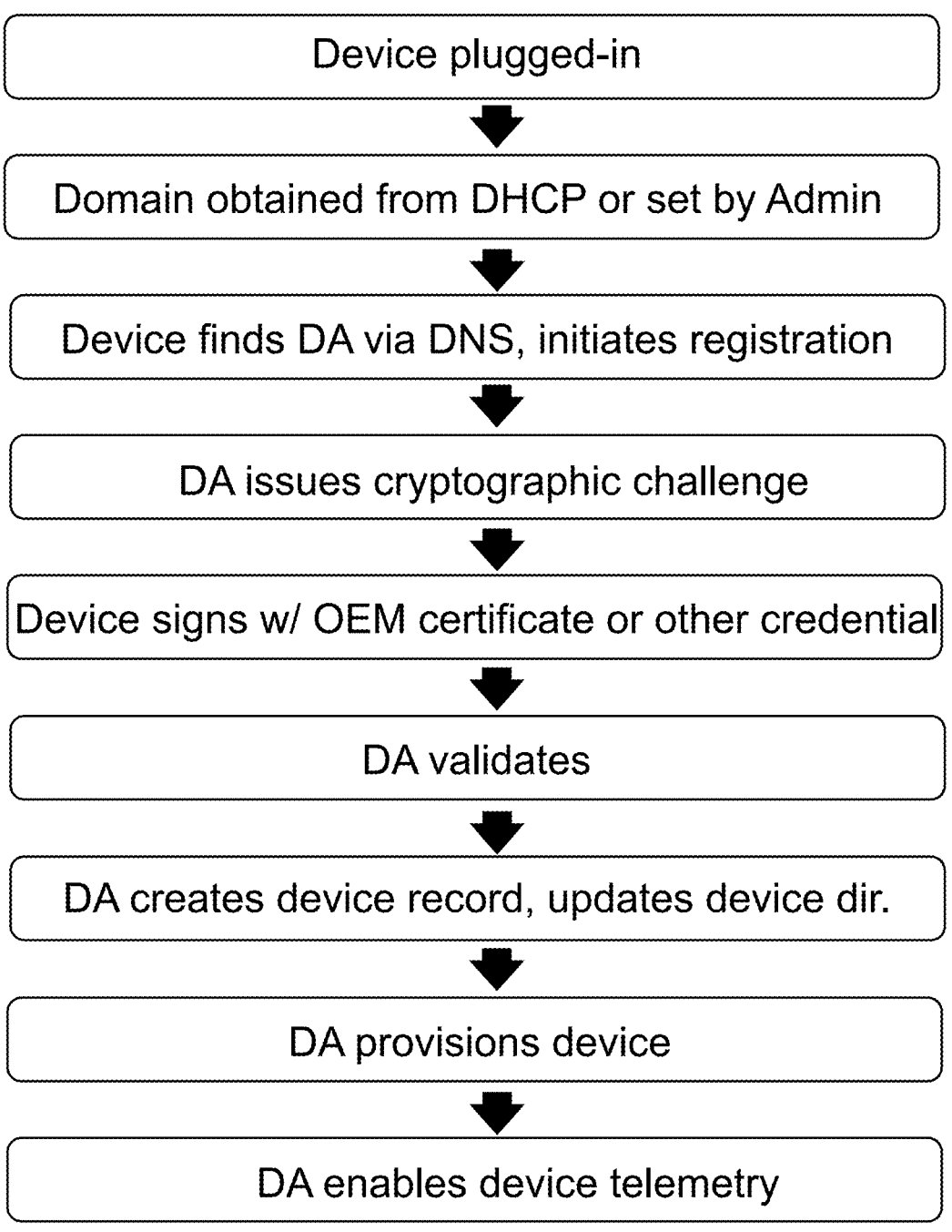

FIG. 05: A device self-registration workflow.

Figure 6:
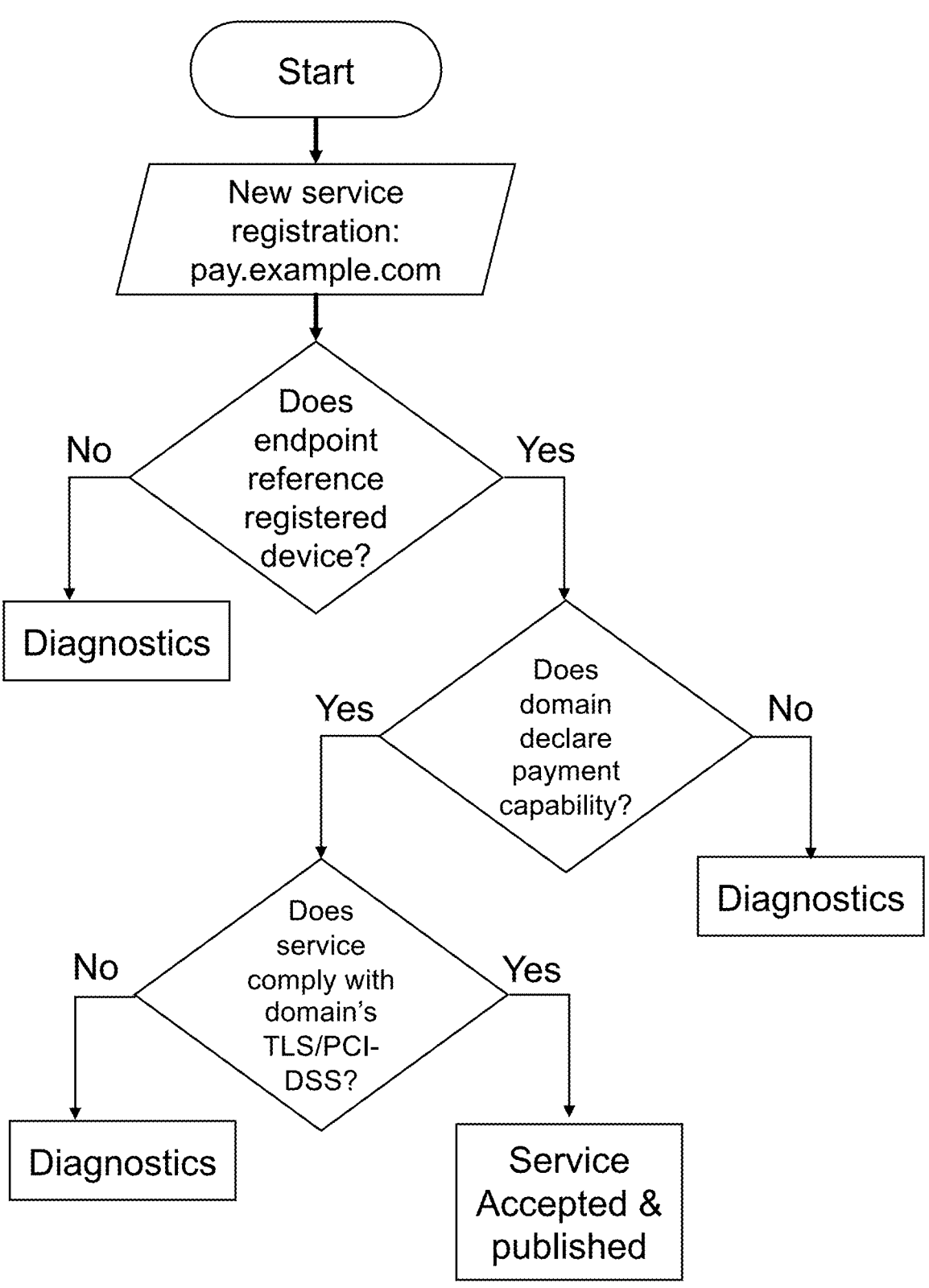

FIG. 06: A DA performing cross-validation during service registration.

Figure 7:
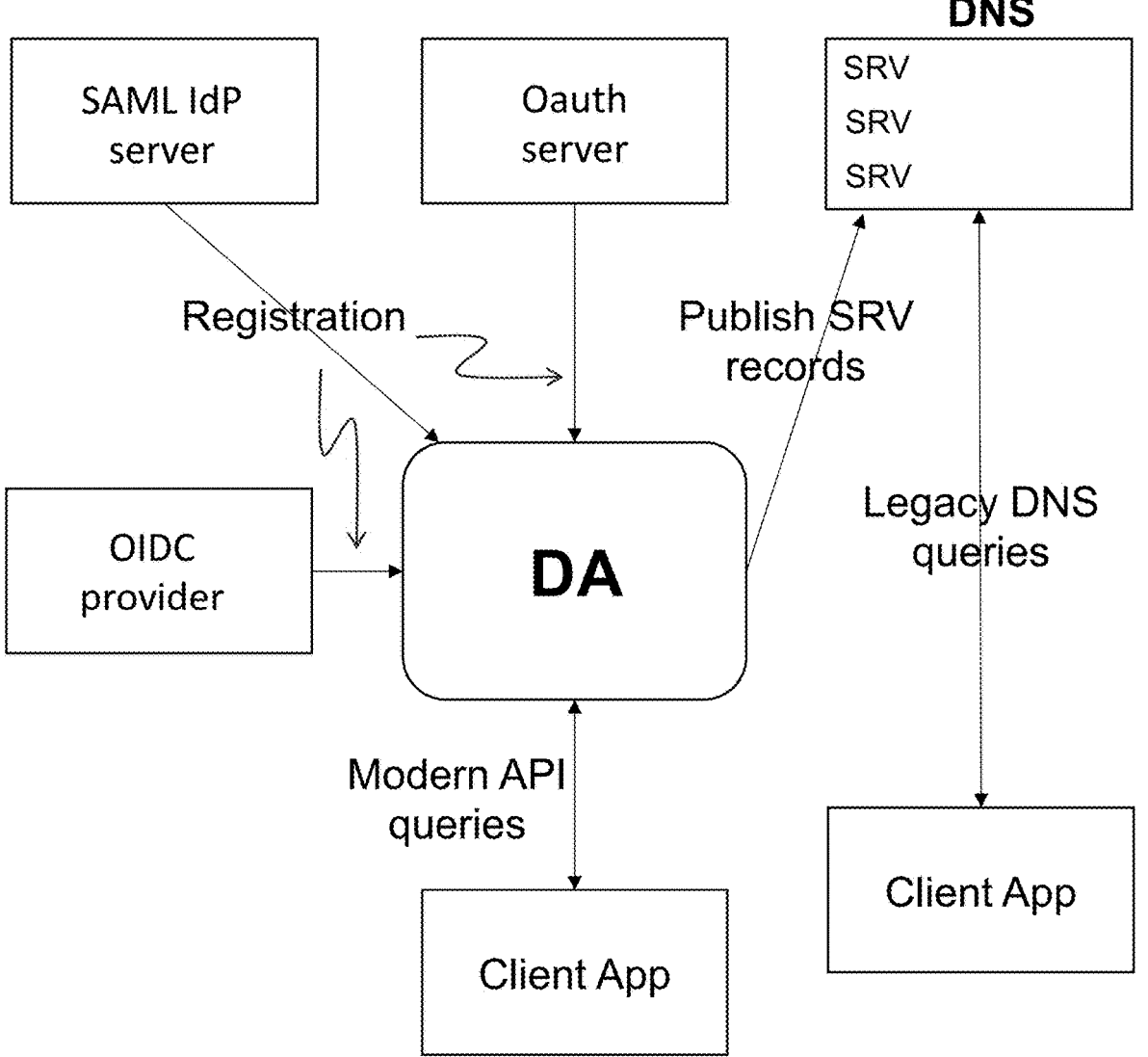

FIG. 07: DA embodiment providing service discovery via DNS and APIs.

Figure 8:
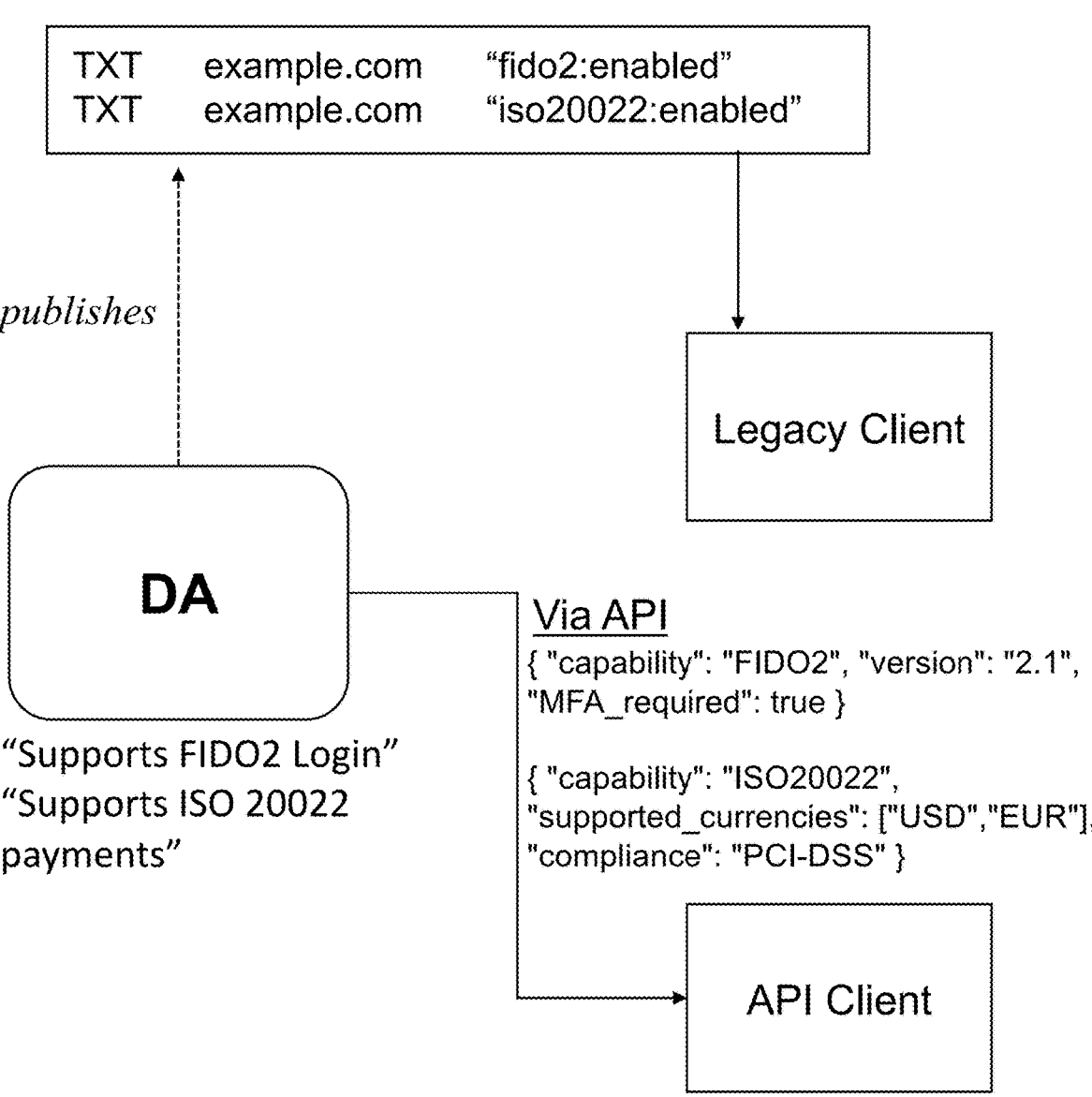

FIG. 08: DA embodiment providing capability declaration via DNS and APIs.

FIG. 09: DA embodiment collecting email policies and delivering them via DNS and API.

FIG. 10: Authentication and role-based authorization table for DA users.

FIG. 11: A high-level overview of major capabilities provided by a DA embodiment.

Figure 12:
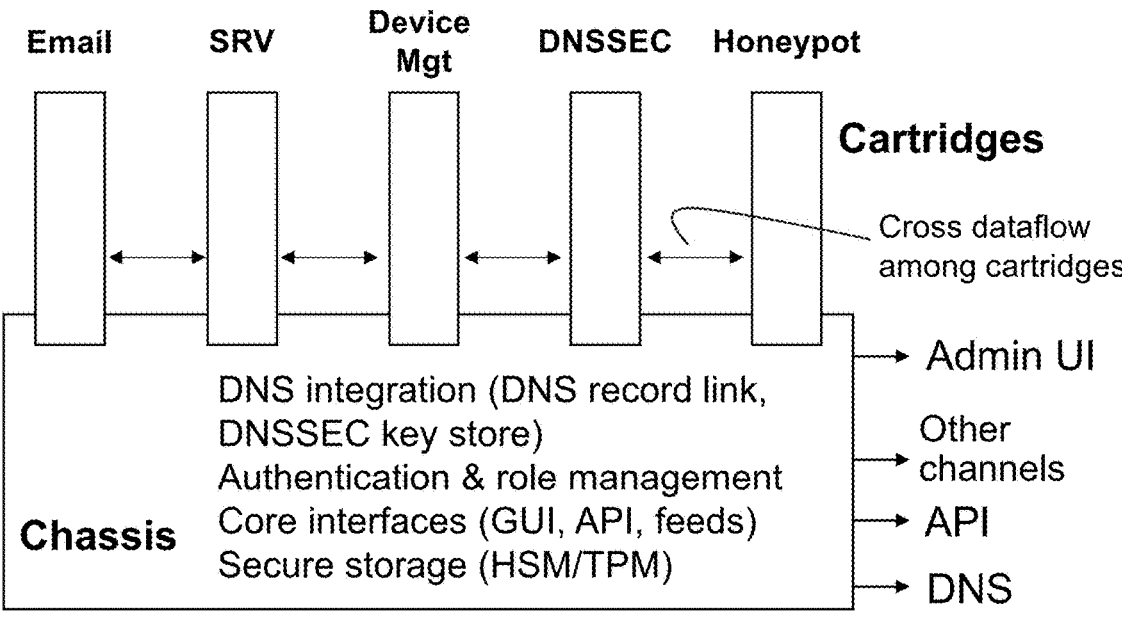

FIG. 12: A schematic of the Chassis-Cartridge architecture for the DA.

Figure 13:
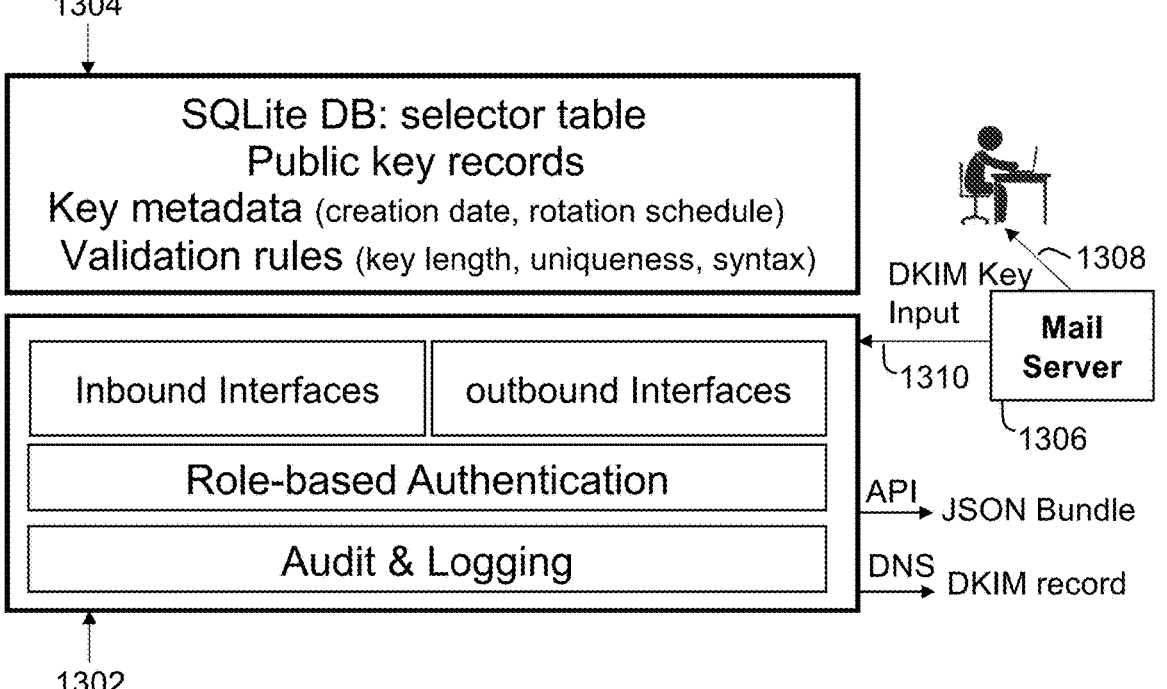

FIG. 13: An overview of an embodiment of a DKIM cartridge.

FIG. 14: A table containing an illustrative list of DA cartridges.

FIG. 15A: Architecture of a DA embodiment equipped with DNSSEC.

FIG. 15B: Workflow of a DA signing with DNSSEC keys.

Figure 16:
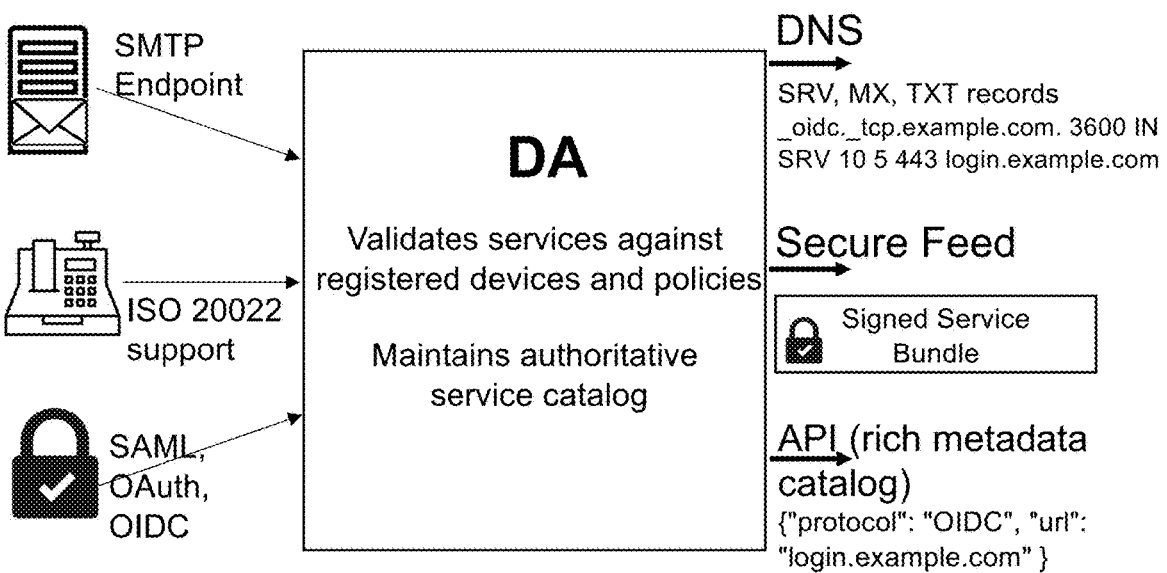

FIG. 16: Overview of Service Management and Discovery with DA.

Figure 17:
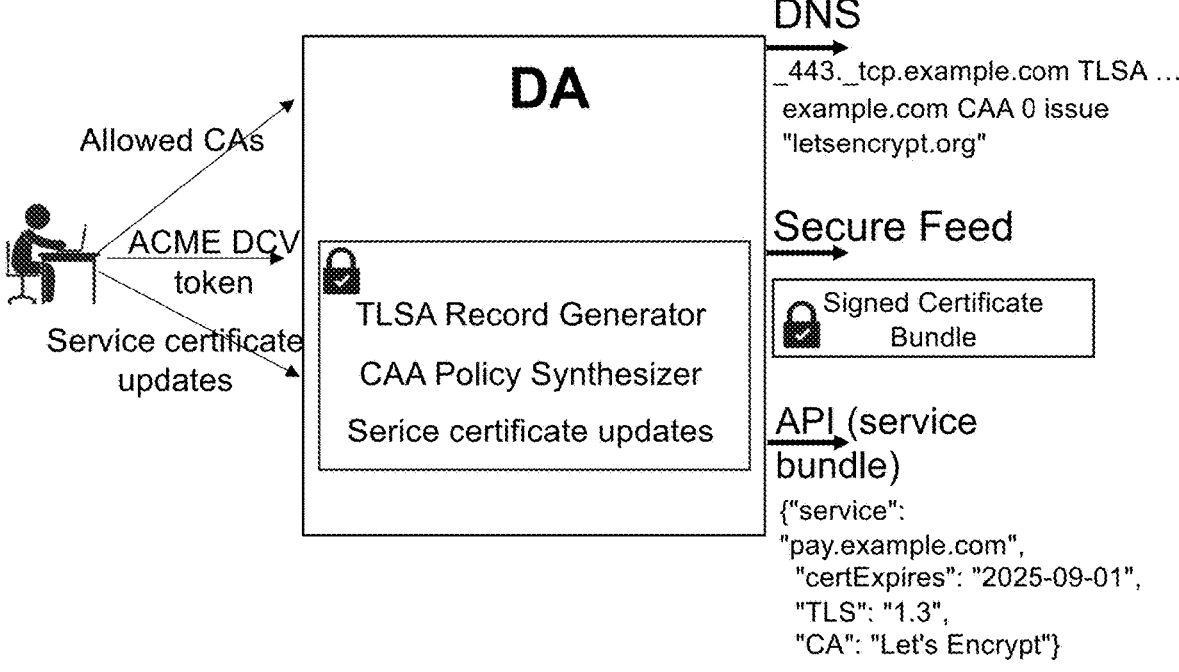

FIG. 17: Overview of Certificate Management with DA.

Figure 18A:
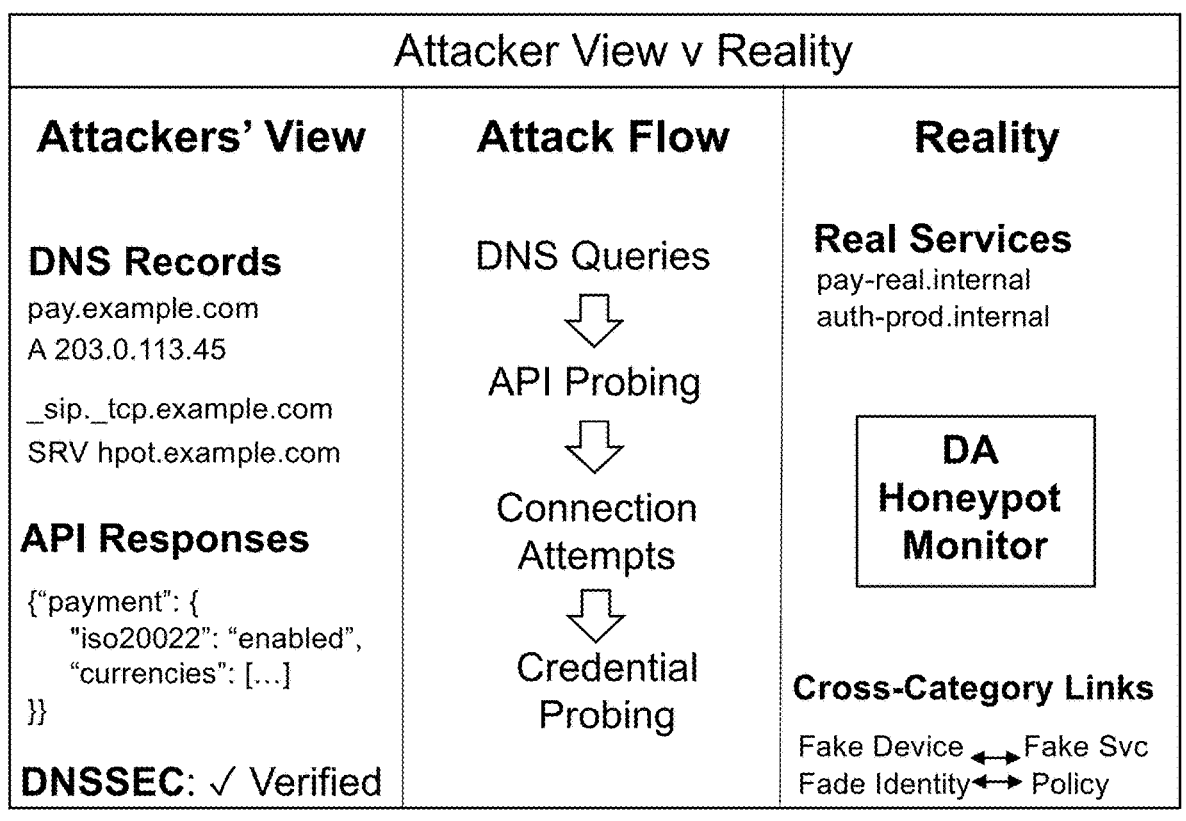

FIG. 18A: Overview of a DA-based honeypot set up.

Figure 18B:
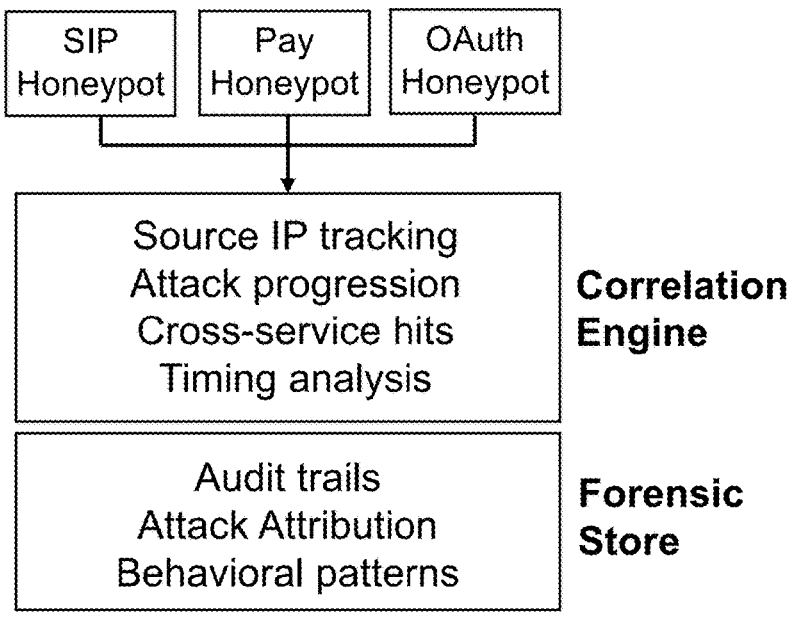

FIG. 18B: Overview of a DA-based Honeypot Monitor.

Figure 19:
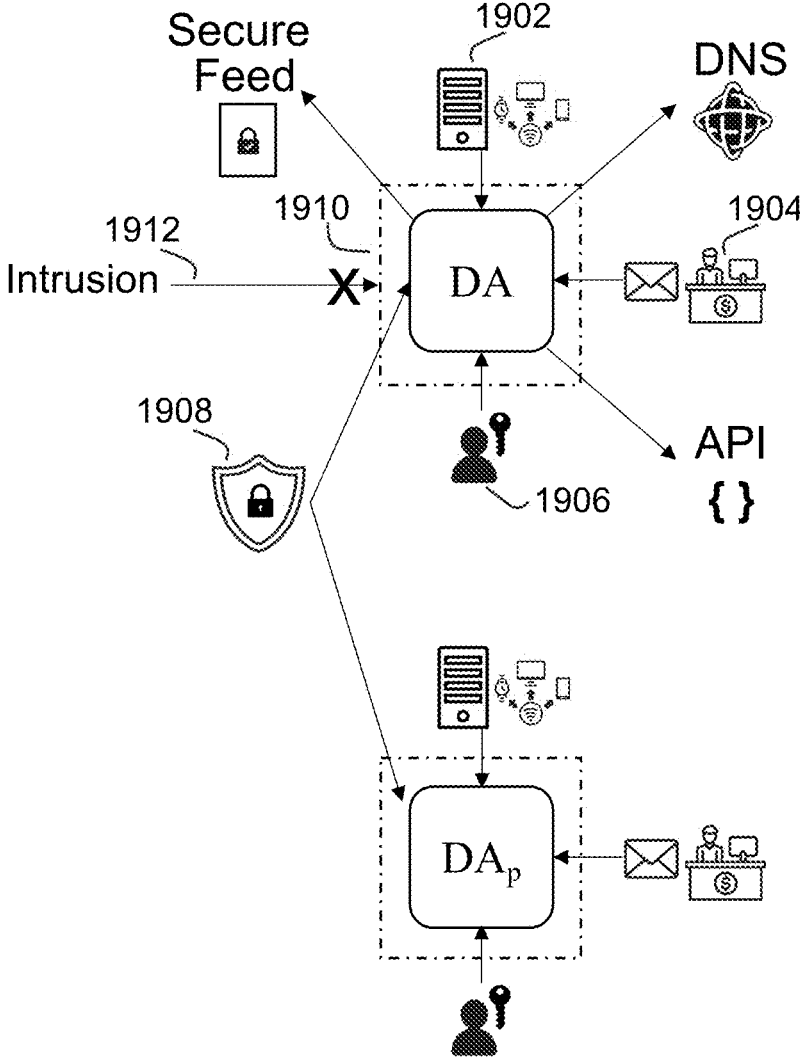

FIG. 19: A pictorial depiction of a DA embodiment supporting a Zero Trust Domain.

FIG. 20: A pictorial view of delegable and revocable subdomain trust anchors.

DETAILED DESCRIPTION

1. Overview of the Domain Authority (DA)

The Domain Name System (DNS) remains the Internet's universal directory, but its rigid structure and static, record-based model render it difficult to manage securely or evolve with new features. DNS records are short, isolated, and manually updated, which leads to frequent misconfigurations, inconsistent policies, and slow adoption of new standards such as DNS Security Extensions (DNSSEC) or DNS-based Authentication of Named Entities (DANE).

The Domain Authority (DA) addresses these limitations by serving as a trusted entity designated by a domain, via a DNS record containing a predetermined type indicator and an address for accessing the DA, to be the authoritative source of information about the domain (see FIG. 01). The DA consolidates and manages various categories of domain-related information-including devices, services, capabilities, identities, and policies. Unlike static DNS records, the DA can collect, validate, store, and distribute information in any structured format through DNS, APIs, or other secure channels.

While many existing DNS management platforms automate individual records, the DA can provide unified authority with cross-category validation and consistent trust enforcement. If provisioned with domain DNSSEC keys, the DA can cryptographically sign all distributed information to ensure authenticity across DNS and API channels.

By inheriting trust from DNS and providing a consolidated authority, the DA enables cross-checks and consistency enforcement across categories. In typical configurations, service endpoints reference registered devices, identities align with declared capabilities, and policies are validated centrally before distribution. This unified trust model extends DNS from a brittle lookup table into a dynamic, authenticated namespace, allowing domains to maintain coherence across devices, services, identities, and policies.

A DA embodiment may be delivered as a website with Graphical User Interfaces (GUIs) and APIs, as a high-performance service using protocols such as Google Remote Procedure Call (gRPC) or Message Queuing Telemetry Transport (MQTT), or even as an embedded appliance in network infrastructure. Architecturally, it may run as a single monolithic module or as a modular chassis with cartridges for specialized functions such as email policy management or DNSSEC integration. The DA provides domains with centralized control, secure distribution, and a foundation for incremental adoption of new Internet features. See FIG. 03 for a comparison of the DA with the DNS in several different dimensions.

Although the DA is described herein with reference to the apex domain, in some embodiments, the DA may operate at any point in the DNS hierarchy, including subdomains. A DA designated at the apex may consolidate information for all subordinate subdomains, while a DA designated at a subdomain may manage a delegated namespace independently. This flexibility allows organizations to scope DA authority to their administrative or operational boundaries while retaining the same trust and validation model.

2. Categories of Domain-Related Information

As a consolidated authority for a domain, the DA orchestrates a wide range of domain-related information. See FIG. 04 for an illustrative schematic.

2.1 Devices Linked to the Domain

Devices linked to a domain encompass any network-addressable hardware or virtualized endpoint that is addressed through the domain. Examples include servers, container nodes, network appliances, and IoT devices. Although such devices may be deployed across diverse hosting environments—such as on-premises datacenters, cloud platforms, or edge locations—they remain logically associated with the domain for addressing and discovery.

The domain provides the natural level of abstraction for device registration and tracking. A device serving example. com has a clear organizational allegiance to the domain regardless of its physical location. This domain-anchored registration also aligns with how external parties perceive trust: when connecting to api.example.com, clients need assurance that the responding device is legitimately authorized by the domain. By anchoring device identity at the domain level, the DA establishes a single authoritative registry that supports both internal operations and external trust.

The DA provides a unified mechanism for registering, validating, and publishing device information. Devices may be added through administrative input or by automated self-registration using proof-of-control workflows. In some embodiments, the DA issues cryptographic challenges that devices sign using installed keys or hardware modules, ensuring that only legitimate devices are associated with the domain. FIG. 05 shows a device registration workflow from an embodiment.

Registered devices may be associated with descriptive metadata such as role, supported protocols, or compliance requirements. The DA enforces cross-category consistency, requiring that declared device roles align with registered services and applicable policies. For example, a device claiming mail server capabilities must correspond to a registered Simple Mail Transfer Protocol (SMTP) service and comply with the domain's email authentication policies such as DKIM signing requirements and TLS encryption standards.

Device lifecycle management is integrated with the DA: provisioning, active operation, maintenance, and decommissioning are reflected consistently across DNS and API channels. A device entering maintenance mode may be removed from service discovery records, while a decommissioned device may be removed entirely from DNS and API responses.

Through its secure distribution channels, the DA may publish device-related information in DNS records for compatibility, serve richer data through APIs, or deliver signed feeds to trusted consumers. By consolidating this function, the DA transforms device registration from fragmented enterprise databases into a domain-anchored trust mechanism that supports Internet-scale validation and policy enforcement.

Section 2.2 Services Provided by the Domain

Services provided by a domain include functional capabilities that users access under the domain name's authority—traditional Internet services like email and web hosting, authentication endpoints such as OAuth and Security Assertion Markup Language (SAML), business functions like payment gateways, and communication platforms. While these services are often spread across multiple hosting environments and managed in separate administrative silos, external parties perceive them as unified offerings of the domain itself (e.g., mail.example.com, pay.example.com, login.example.com).

The Domain Authority (DA) provides unified service registration with cross-validation, distinguishing it from internal service discovery systems. Unlike cluster-level or datacenter-local tools, the DA anchors service identity to domain-level trust, enabling external validation and policy consistency. Services reference registered devices, align with declared capabilities, and comply with domain-wide policies—creating an authoritative service identity that extends beyond enterprise firewalls to support Internet-scale trust validation. For example, if a domain registers a payment API at pay.example.com, the DA can ensure that the endpoint maps to a registered server device, that the service aligns with the domain's declared capability for secure payment processing, and that domain policies such as Transport Layer Security (TLS) enforcement and Payment Card Industry Data Security Standard (PCI-DSS) compliance are satisfied. FIG. 06 shows a consolidated DA from an embodiment registering a service by providing cross-validation across devices, services, and domain-wide policies.

Or, for example, if a domain registers an authentication service at login.example.com, the DA validates that the endpoint is hosted on a registered device, aligns with the domain's declared capability for single sign-on (SSO), and complies with the domain's policy requiring multi-factor authentication. After these checks, the DA publishes DNS SRV records and enriched API metadata advertising OAuth and SAML endpoints. External parties can trust that the advertised login service is not only operational but also anchored to the domain's authoritative trust mode.

Domain administrators can register services through the DA's interface, or services can self-register through automated discovery methods using cryptographic challenges or integration with Continuous Integration/Continuous Deployment (CI/CD) pipelines. Once registered, services include rich metadata such as supported protocols, security requirements, compliance certifications, and operational constraints, creating a comprehensive registry of the domain's service landscape.

Many embodiments of DA enable dual distribution of service information: publishing DNS records (MX, SRV, TXT) for compatibility with existing clients while simultaneously serving enriched metadata via APIs. This allows legacy systems to continue using traditional DNS lookups while modern applications access bundled service catalogs, capability negotiation, and real-time availability data through a single authoritative query. FIG. 07 shows three authentication services registered with the DA. The DA exposes these via SRV records for legacy client discovery, and via APIs for modern client applications, where richer metadata such as supported protocols and capabilities can be delivered.

The DA's API-driven service registration supports ephemeral compute environments, including serverless cloud platforms and function-as-a-service deployments (e.g., AWS Lambda), where service endpoints may change frequently. In such configurations, the DA can provide authoritative service identity, enabling consistent registration, validation, and discovery of transient and dynamically-provisioned services across a variety of deployment models.

This unified service registry supports gradual protocol transitions—domains can introduce new authentication methods like OpenID Connect (OIDC) alongside existing SAML endpoints, promote modern payment APIs while maintaining legacy endpoints, or transition email authentication from SPF to DMARC without service disruption. External parties adapt at their own pace while the DA maintains consistency across all distribution channels.

2.3 Capabilities Offered by the Domain

Beyond devices and services, a domain may expose capabilities—functional affordances that describe what the domain can do (not just the discrete endpoints it hosts). Examples include single sign-on (SSO), multi-factor authentication, federated identity support, secure payment processing, or compliance attestations.

The DA provides unified capability authority, consolidating what are today fragmented signaling mechanisms spread across ad hoc DNS records, well-known URIs, and proprietary metadata files. Capabilities declared through the DA are validated across the domain's devices and services, ensuring that advertised features reflect actual implementation. For example, if a domain declares support for passwordless authentication via Fast Identity Online 2 (FIDO2), the DA verifies that the registered services and devices consistently implement the feature (before publishing it). Similarly, a media-streaming domain may declare a capability for supporting Encrypted Media Extensions (EME) to enable Digital Rights Management (DRM) in browsers; the DA ensures that its streaming servers actually implement EME and the required cipher suites before advertising the capability through DNS flags or enriched API metadata. In both cases, consumers of the capability can trust that the declaration is authoritative and is enforced consistently across the domain's infrastructure.

Capabilities may be distributed in multiple forms: standard flags in DNS for legacy discovery, and richer metadata via APIs for modern integrations. For instance, a financial-services domain may expose high-level payment support in DNS while publishing detailed protocol versions and compliance attestations via the DA's APIs. FIG. 08 shows an embodiment declaring two capabilities via DNS and delivering rich metadata to modern clients via API.

This centralized capability registry allows domains to advertise new capabilities in parallel with legacy methods, reducing deployment risk and enabling consumers to rely on a single authoritative source for consistent, trustworthy capability discovery.

2.4 Identities Acting on Behalf of the Domain

A domain may designate and manage identities that act on its behalf, including human users, service accounts, automated bots, and machine identities such as TLS certificates or API keys. Each identity requires both internal recognition and external validation by other parties.

The Domain Authority (DA) anchors identity trust at the domain level, extending beyond traditional directories or fragmented PKI systems. While siloed approaches involve multiple applications that maintain their own certificate store, the DA creates consistent identity validation across devices, services, and capabilities.

For example, an administrative identity such as admin@example.com can be published in DNS as a contact record per RFC standards while the DA distributes detailed role-based permissions via APIs—specifying device management scope, service configuration authority, and policy modification rights. This ensures administrative privileges are recognized consistently throughout the domain. This ensures administrative privileges are recognized consistently throughout the domain. Similarly, a service identity such as payments@example.com can be published in DNS with basic service information while the DA provides enriched metadata via APIs, including certificate fingerprints, supported authentication methods, and transaction limits.

Standard roles may be published in DNS (e.g., designated contact addresses), while richer metadata is distributed through APIs, such as public keys for verifying receipts or constraints on automated accounts. Lifecycle events—activation, suspension, or revocation—are bound to the domain namespace, ensuring that identity status propagates consistently across systems. This model supports incremental adoption of stronger identity protocols while maintaining compatibility with existing ones.

2.5 Policies Governing Access to Domain Resources

Policies govern how a domain's resources are accessed, authenticated, and used. Today, such policies are fragmented across DNS TXT records, embedded configurations, ad hoc tokens, and local application rules, making consistent policy management and evolution difficult.

The Domain Authority (DA) provides consolidated policy management with cross-category validation. As opposed to governance tools that operate only inside organizations, the DA enforces policy coherence across devices, services, capabilities, and identities. For example, an email policy declaring that all outbound messages must be signed with DKIM is validated by the DA against registered mail servers and their published keys, ensuring that the policy is both technically enforceable and correctly bound to actual devices. As another example, a branding policy requiring the use of a BIMI logo is validated against declared service endpoints such as mail.example.com, so that the logo is consistently applied to authenticated email services and not mistakenly associated with unrelated or unregistered servers.

Policies may be contributed by different stakeholders through controlled interfaces, and are distributed through DNS for broad interoperability, APIs for enforcement engines, or signed files for enterprise compliance systems. By centralizing policy definition and cross-validating it against domain resources, the DA reduces misconfiguration risk, accelerates standards adoption, and creates a single authoritative reference for external validation. FIG. 09 depicts a DA embodiment collecting email policy inputs from administrators and stakeholders through its GUI interface, validating and consolidating them, and publishing them on the DNS for legacy clients, as well as delivering them as an email policy bundle to API clients. The GUI access may be controlled by authentication and role-based authorization, as shown in FIG. 10.

Policies may also encompass domain-wide authentication requirements. For instance, a domain could enforce that all administrative logins or API access require MFA with TOTP codes, publishing this policy through DNS for global interoperability and via APIs for enforcement engines. This centralized enforcement reduces the risk of inconsistent security practices across services and ensures that MFA/TOTP requirements are applied uniformly across the domain's devices, services, and identities.

2.6 Consolidation Across Categories

A feature that unites these categories is that the DA anchors them all to the domain itself and enforces cross-validation across them. This domain-level anchoring provides the trust foundation, while the cross-validation ensures that each record is evaluated in the context of the domain's overall configuration rather than managed in isolation. For example, an email policy is not published independently but validated against the mail servers and service accounts it references, then published and distributed atomically as a complete bundle (SPF, DKIM, DMARC) to prevent partial or inconsistent enforcement. Such consolidation goes beyond efficiency: it provides a single coherent framework where domain-related information is authoritative, consistent, and trusted by both internal administrators and external relying parties.

FIG. 03 illustrates an adoption cycle enabled by the Domain Authority (DA). The DA's unified architecture creates a positive feedback loop for feature adoption. Easy deployment through preconfigured defaults and guided wizards encourages initial adoption. Once established, the DA enables cross-feature synergy where new capabilities leverage existing infrastructure (e.g., DNSSEC signing for all registered services). API-based distribution allows experimentation with emerging features before standardization, while integrated telemetry provides usage data to guide adoption decisions. This evidence-based approach supports continuous improvement of both the DA platform and Internet-wide feature deployment.

3. Core Functions of the Domain Authority 3.1 Collection

Current domain management requires administrators to update disparate systems—DNS records, certificate authorities, service registries, and identity providers—each with different interfaces, validation rules, and access controls. This fragmentation creates consistency gaps and deployment bottlenecks across the domain's infrastructure.

The Domain Authority (DA) provides unified, role-based, policy-driven intake across all domain categories with consistent provenance tracking. Unlike system-specific tools, the DA accepts information from authorized administrators, self-registering devices and services (via cryptographic proof-of-control), and automated feeds from enterprise systems, applying appropriate validation and normalization rules across all sources. FIG. 10 depicts authentication and role-based authorization that are used to authenticate and authorize users (including services, bots) for information input across domain categories.

A key innovation is automated domain control validation (DCV) lifecycle management. The DA can publish verification tokens on behalf of the domain, monitor their consumption by domain verification services, and automatically retire the tokens after use. This eliminates persistent "verification litter" in DNS zones and prevents inadvertent disclosure of what third-party services a domain relies upon—two problems endemic to today's DCV processes.

This unified intake produces normalized, versioned records with complete audit trails, enabling consistent policy enforcement and cross-category validation that fragmented collection systems cannot achieve.

3.2 Validation

Traditional DNS and configuration management systems validate individual records in isolation, leading to inconsistencies when related configurations span multiple systems—service endpoints that reference non-existent devices, policies that conflict across applications, or expired certificates that break authentication chains. For example, a domain's DNS SPF record might authorize email sending from IP range 192.168.1.0/24 while the corporate firewall policy blocks outbound SMTP from half that range (192.168.1.50-100), and the DKIM selector in DNS points to an expired key that was rotated on the mail server but never updated in DNS. External recipients see conflicting authentication signals—messages that should pass SPF fail due to firewall blocking, while DKIM validation fails due to the stale DNS record, even though the domain owner believes their email authentication is properly configured.

The DA performs cross-category semantic validation that leverages its consolidated view of the domain. In typical configurations, service registrations reference registered devices; capability declarations align with actual service endpoints; and identity certificates comply with declared domain-wide policies. For example, a device registered as a "payment gateway" also maps to declared payment services and conforms to financial security policies.

Validation incorporates domain-level enforcement through cryptographic checks, temporal safeguards, and configurable pipelines tailored to record types. These pipelines adapt to the category of information—devices, services, capabilities, identities, or policies—ensuring each is evaluated appropriately. Enabled by the DA's consolidated domain view, this semantic validation enforces coherence and integrity across all linked entities. For examples of modular validators, see the parent application Ser. No. 18/199,965 of this application.

3.3 Storage

DNS provides flat, isolated records with limited metadata, while enterprises typically maintain separate repositories for devices, services, identities, and policies across different management systems. This fragmentation makes it difficult to enforce relationships or maintain consistency across the domain infrastructure.

The DA addresses this fragmentation by providing a unified repository where domain-related information is explicitly interconnected: devices are linked to the services they host, services are validated against their declared capabilities, and identities are bound to applicable policies. Unlike traditional approaches that manage these categories independently, the DA enforces cross-category validation to ensure consistency and prevent configuration conflicts.

Because the DA inherits DNS trust, it becomes a high-value attack target requiring comprehensive security measures. Beyond protecting DNSSEC private keys in HSMs and encrypting credentials at rest, the DA implements standard enterprise security controls including multi-factor authentication, role-based access, audit logging, network isolation, and automated threat detection. In some embodiments, the DA deploys honeypots to actively attract and monitor attackers while maintaining service availability through geographic replication and rate limiting. Many embodiments include one or more of the security features shown in the enclosed table.

A core innovation of the DA is dual-format synthesis: the DA stages and atomically promotes coordinated updates that simultaneously generate DNS records for compatibility and rich API responses for other consumers that consume the DA information via API, push channels or message queues.

This prevents partial updates (a common source of DNS misconfiguration), ensuring that all channels remain consistent.

| Security Control | Implementation |
| --- | --- |
| Key Protection | DNSSEC keys in HSMs/TPMs, automated rotation |
| Access Control | Multi-factor authentication, role-based permissions |
| Network Security | Segmentation, intrusion detection, encrypted channels |
| Monitoring | Audit logs, behavioral analysis, anomaly detection |
| Availability | Geographic replication, rate limiting, DDoS mitigation |
| Deception | Honeypots for attacker detection and analysis |

DAs also support version control and rollback, and endpoint lifecycle management that allows old APIs or record formats to be served alongside new ones with explicit deprecation metadata. This ensures the DA remains a stable trust anchor even as protocols evolve.

3.4 Distribution

Once information has been collected, validated, and securely stored, the Domain Authority (DA) may distribute it to consumers through coordinated, multi-channel delivery. Traditional DNS management updates individual records in isolation, often through manual edits to zone files or web-based management tools, with little coordination across record types or administrative silos. By contrast, the DA generates outputs—DNS records for compatibility, enriched metadata via APIs, and secure feeds for specialized consumers—from the same authoritative source, ensuring consistency across channels.

In some embodiments, APIs enable atomic retrieval of related records in single responses (e.g., SPF, DKIM, and DMARC bundles with DNSSEC signatures) and support graduated access levels: public consumers may receive only basic discovery data, while authenticated partners receive enriched metadata such as supported protocols, regional availability zones, or compliance guarantees. The DA's integrated telemetry may also track distribution across channels, giving administrators immediate insight into adoption patterns and enabling rapid policy adjustments without waiting for DNS propagation delays. In embodiments provisioned with DNSSEC keys, all output channels—DNS, APIs, and feeds—may be cryptographically signed for authenticity and integrity.

For workflows that require administrative oversight, the DA may generate properly formatted DNS records and present them to authorized administrators for approval before publication, ensuring both human review and consistency across distribution channels.

Distribution may also be context-aware. For example, the DA may publish a single BIMI logo reference in DNS for universal consumption, while authenticated APIs return geo-specific logos to email service providers. Similarly, a payment gateway might advertise basic availability to the public while exposing richer operational metadata—such as throughput limits or supported payment rails—only to authorized financial partners. These differentiated disclosures remain consistent with domain policies and may be cryptographically signed, ensuring integrity even when tailored to the requester context.

Beyond DNS and APIs, DA embodiments may support other secure delivery mechanisms, including signed configuration feeds for regulators, push notifications to security operations centers, or message queues for multi-tenant synchronization. Selective distribution policies may limit certain services or capabilities to specific channels or authenticated audiences, enabling controlled visibility without fragmentation. This multi-channel model reduces DNS clutter, supports richer integrations, and provides domains with flexibility to tailor disclosure while maintaining a single authoritative trust anchor.

3.5 Telemetry and Usage Logging

Currently, DNS provides no feedback beyond coarse resolver logs, leaving domain owners blind to how their published records are consumed. The DA model, however, inherently allows integrated telemetry because it serves data through authenticated APIs and structured feeds in addition to DNS. Thus, domains can observe how their published information is actually used: API query logs reveal adoption of new protocols, SRV queries reveal real service discovery behavior, and policy access logs reveal which enforcement rules are exercised.

For example, telemetry may show that OpenID Connect (OIDC) endpoints are receiving 90% of authentication traffic while older SAML endpoints are nearly idle—evidence that supports safe deprecation. Similarly, monitoring failed validation attempts can highlight misconfigurations before they become outages.

Beyond operational analytics, the DA's telemetry system enables security monitoring by correlating access patterns across devices, services, and identities. This integrated visibility supports threat detection, attack attribution, and forensic analysis—capabilities that fragmented monitoring systems cannot achieve due to their limited cross-category visibility.

In addition to providing operational insights to individual domains, telemetry collected by the DA has ecosystem-level value. Aggregate usage metrics across domains can reveal which emerging features are gaining traction (e.g., adoption rates of new authentication protocols or payment APIs), enabling standards bodies, browser vendors, and infrastructure providers to prioritize support where it is most impactful. For example, telemetry showing increasing queries for ISO 20022 payment capabilities could inform payment networks of the need to accelerate their adoption roadmaps. Thus, the DA not only helps domains manage their own resources but also feeds into the incremental adoption of Internet standards at large.

3.6 DA with Authenticated Access

Traditional DNS provides no access control mechanisms—any resolver can query any record, and all information is equally visible to all parties. This binary model (public or private) cannot accommodate the nuanced trust relationships that exist in modern domain ecosystems, where different parties require different levels of information access based on their role, relationship, or authorization level.

In some embodiments, the DA implements a graduated trust model with specific access levels that control information disclosure. Public APIs at da.example.com/api/public/services return basic service discovery (e.g., payment gateway available at pay.example.com, supports TLS 1.3) without requiring credentials. Partner APIs at da.example.com/api/partner/services may require authentication tokens and return enhanced metadata including current transaction capacity (e.g., 500 transactions per second), regional availability zones, and SLA guarantees (99.9% uptime commitment). Administrative APIs at da.example.com/api/admin/services may require administrative credentials and expose comprehensive operational data, including device resource utilization, policy violation counts, certificate expirations, and performance analytics.

For example, a payment processor partner might authenticate with an API key to discover that pay.example.com currently operates with 40% capacity utilization and supports both ISO 20022 and legacy payment protocols, while the general public only sees basic service availability. Conventional API gateways typically secure application endpoints, whereas the DA secures disclosure of domain-level authoritative data, ensuring that credentialed access inherits DNS trust. Credentials may be issued and revoked by domain administrators via the DA's management console.

One DA embodiment enables real-time access control adjustments through policy changes that take effect immediately. During a detected intrusion attempt, the domain administrator can execute an API call that restricts da.example.com/api/services to authenticated users while maintaining DNS A records for basic connectivity. Essential partners like payment processors retain access through pre-established API keys, while public service discovery is temporarily suspended. For instance, if attackers are probing payment endpoints, the DA can quickly hide pay.example.com from public API responses while continuing to serve authenticated queries from trusted payment networks, mitigating reconnaissance while maintaining business operations. These adjustments incur minimal DNS propagation delay and do not require TXT record updates or TTL wait periods.

Authentication can also extend to inter-domain relationships through mutual credential verification and can be particularly effective during enterprise mergers and coordination between a multi-national and its regional subsidiary, subject to local regulations. A parent corporation at corporate.example.com can establish authenticated DA-to-DA channels with subsidiaries at subsidiary1.com and subsidiary2.com using shared cryptographic keys or OAuth-style token exchange. When subsidiary1.com's DA queries corporate.example.com/api/federation/policies, it presents its domain-issued credentials and receives policy updates, compliance requirements, and authorized service catalogs not available through public APIs, enabling coordinated governance across organization boundaries that application integrations alone cannot achieve.

In some embodiments, credential management integrates with the DA's telemetry, recording that partner-key-2847 accessed payment service metadata n times this month, while admin-token-corp accessed device configurations m times, enabling precise usage attribution for compliance reporting and security monitoring. This granular access logging supports forensic analysis ("which credential holder accessed certificate private keys during the security incident?") and policy effectiveness measurement that anonymous DNS queries cannot provide.

3.7 Consolidation of Core Functions

Taken together, these functions establish the DA as more than an automation layer for DNS. Information is collected from administrators, systems, and third-party services under a common intake; validated against both syntactic rules and semantic consistency across the domain's devices, services, capabilities, identities, and policies; and then stored in a structured, versioned repository that synthesizes both DNS-compatible records and rich API responses atomically. Finally, telemetry and usage logging close the loop by providing domains with real-world feedback on adoption, effectiveness, and compliance. This cycle enables embodiments of DA to operate as a true domain-anchored trust authority—one that continually enforces coherence across categories, distributes data consistently across channels, and adapts dynamically based on evidence rather than guesswork. FIG. 11 provides an overview of the various capabilities provided by a DA embodiment.

4. Chassis-Cartridge Architecture for the DA

In some embodiments, the DA may be implemented using a chassis-cartridge architecture that combines unified authority with modular extensibility. The DA is implemented as a chassis that anchors trust—providing DNS integration, administrator authentication, role management, and DNSSEC key storage—while cartridges supply domain-specific logic under that shared trust umbrella. This structure preserves the advantages of centralization (coherent authority, cross-category validation, unified security) while enabling modular adoption of only the functions required by a given domain, allowing organizations to incrementally deploy domain management capabilities without wholesale infrastructure changes.

Cartridges encapsulate specialized logic and data models for particular functions, such as email policy management, device registration, or service discovery. Unlike plugins in plugin frameworks that operate independently, cartridges benefit from the DA's unified trust model and participate in cross-category validation—an email cartridge can verify that declared mail servers correspond to registered devices, while a service cartridge ensures endpoints align with device capabilities and domain-wide policies. This cross-validation capability distinguishes the architecture from traditional modular systems that lack unified domain authority.

An Email Cartridge illustrates this approach by managing SPF, DKIM, and DMARC policies through the chassis's trust infrastructure. When administrators input DKIM selectors and public keys, the cartridge validates formatting and policy alignment, stores versioned records with rotation metadata, and provides the chassis with synthesized DNS TXT records and API responses. The chassis ensures consistent distribution across all channels while the cartridge maintains email-specific expertise, demonstrating how specialized functions leverage unified domain authority.

This modularity enables organizations to adopt specific domain management functions—email security, device registration, certificate management—without deploying a bloated DA infrastructure, while each cartridge benefits from the chassis's unified trust, dual-channel distribution, and cross-validation capabilities that maintain the DA as a single authoritative source rather than a collection of fragmented tools.

FIG. 12 provides a pictorial depiction of the Chassis-Cartridge architecture. FIG. 13 provides a depiction of an example DKIM cartridge from an embodiment: 1302 labels the chassis, 1304 labels the DKIM cartridge, 1306 labels the domain's Mail Server, 1308 labels the admin inputting the DKIM public and private keys along with a selector, and 1310 labels the chassis, as instructed by the cartridge, requesting the DKIM public key from 1306. 1302 publishes a DKIM record on the DNS (e.g., sell._dk.example.com IN TXT "v=DKIM1; k=rsa; p=<DKIM key>"), and delivers the DKIM and DMARC as a signed JSON bundle to API users. FIG. 14 provides an illustrative list of cartridges for a DA chassis embodiment.

5. Embodiment: Integration with DNSSEC and Security Features

DNS Security Extensions (DNSSEC) provide cryptographic authentication for DNS data but have achieved only 3-5% adoption worldwide in the last twenty years due to its operational complexity. DNSSEC requires careful management of cryptographic keys, canonicalization rules, rollover procedures, and chain-of-trust maintenance—processes that are error-prone and difficult to implement in a static DNS infrastructure.

Conventional DNSSEC deployments are typically confined to DNS-delivered records, whereas the DA can apply cryptographic signing uniformly across all distribution channels. In one embodiment, the DA manages all DNSSEC operations on behalf of the domain, including secure storage of private keys—optionally within hardware security modules (HSMs)—and automation of key generation, record signing, and rollover workflows. DNS records, API responses, and secure feeds are signed using the same DNSSEC key material, enabling consistent trust validation regardless of whether consumers access domain information via legacy DNS lookups or modern API-based integrations.

The DA embodiment enables pre-signed bundle distribution where related policies (SPF, DKIM, DMARC) are delivered as single signed objects, allowing atomic validation across interdependent records rather than separate DNS lookups. This capability extends DNSSEC's benefits beyond individual record authentication to policy-set consistency validation, dramatically improving performance while ensuring that consumers receive coherent, verified configurations that traditional DNS fragmentation cannot guarantee.

An embodiment may be provisioned with a Key Signing Key (KSK). It generates one or more Zone Signing Keys (ZSKs), storing the private keys in a hardware security module (HSM) or trusted platform module (TPM). The DA signs all zone records by hashing canonicalized Resource Record sets (RRsets), and signing with the ZSK of the corresponding zone to produce RRSIG records that are published alongside the DNS records. For related records such as SPF, DKIM, and DMARC, the DA may assemble them into a JSON bundle, sign the bundle with the same ZSK, and expose it via API so consumers can validate the entire set atomically. During key rollover, the DA publishes a new ZSK in parallel with the existing one, dual-signs records for a transition period, and then retires the old key once propagation is confirmed. For KSK changes, the DA generates the replacement key, produces the corresponding DNSKEY, and guides the domain administrator through one-time submission of an updated Delegation Signer (DS) record to the registrar. This workflow ensures that a skilled administrator can deploy DNSSEC through the DA without manual handling of cryptographic details or risk of breaking the chain of trust.

FIG. 15A shows the internal architecture of a DA of example.com equipped with DNSSEC features. This DA embodiment includes a secure storage layer for maintaining signed DNS records and bundles, a hardware security module (HSM) that securely stores the private Key Signing Key (KSK) and Zone Signing Keys (ZSKs), and outbound distribution channels that can deliver: (a) signed DNS records for compatibility with legacy resolvers, (b) signed bundles (e.g., SPF, DKIM, DMARC policies) via APIs for richer atomic validation, and (c) signed JSON or other formats via push feeds for specialized clients.

FIG. 15B shows the operational workflow for deploying DNSSEC through the DA for the domain example.com. The DA is provisioned with the KSK and derives the ZSKs for subordinate zones. Administrators perform a one-time registrar action to submit a DS record to the parent (.com) registry so that the parent validates the domain's KSK. The DA publishes DNSKEY records announcing its KSK and its ZSKs and RRSIG records validating them. With this chain of trust infrastructure in place, the DA can serve cryptographically signed versions of DNS records through DNS, API bundles, or alternate secure feeds. In some embodiments, the DA not only signs DNSKEY and RRSIG records for ordinary resource records (A, MX, TXT, etc.), but also signs the DNS record that designates the DA itself (e.g., a TXT, SRV, or new-type record pointing to da.example.com). By signing its own designation record with DNSSEC keys, the DA makes its authority self-authenticating: resolvers and clients can verify that the DA is the legitimate authority for the domain before consuming any data distributed through DNS, APIs, or alternate secure channels.

By relocating DNSSEC operations from a fragmented DNS infrastructure into a consolidated domain authority, the DA minimizes the operational barriers that have limited DNSSEC adoption. Domain owners perform one-time DS record submission to their registrar, while the DA manages all cryptographic complexity, such as canonicalization, record signing, and key rotation. This architectural transformation has the potential to accelerate DNSSEC deployment from single-digit adoption to mainstream use, strengthening Internet security.

6. Embodiment: Service Management and Discovery via the DA

Service Location (SRV) records enable domains to advertise services with load balancing and priority information, but they remain underutilized due to management complexity. While SRV records provide valuable service discovery for consumers, they are difficult for providers to manage—requiring manual encoding of service attributes into static DNS zones that cannot accommodate frequent changes or rich metadata such as protocol versions, authentication requirements, or compliance certifications. This creates a mismatch: SRV records serve consumers well but are unwieldy for providers.

In one embodiment, the Domain Authority (DA) serves as the authoritative registry for services offered under a domain, consolidating service management with cross-category validation that ensures consistency across devices, capabilities, identities, and policies. Unlike internal registries such as Consul, etcd, or Kubernetes service discovery that operate inside enterprise boundaries, the DA anchors service identity to domain-level trust, enabling external validation and policy coherence. For example, a declared authentication endpoint must reference a registered device, align with declared identity capabilities, and comply with organizational security policies. A payment gateway must be tied to registered financial service devices and validated against domain-wide compliance requirements.

Once registered, services include rich metadata such as supported protocols, TLS requirements, compliance certifications, geographic availability, and service-level guarantees. The DA then publishes this information through coordinated channels:

DNS Publication: For maximum compatibility, the DA generates SRV, MX, and TXT records so that legacy clients can continue to discover services using standard DNS lookups (e.g., _sip._tcp.example.com SRV 10 60 5060 sip1.example.com).

API Delivery: The DA exposes authenticated APIs that deliver enriched metadata, enabling clients to retrieve bundled service catalogs atomically. For example, a query to da.example.com/api/services/auth may return all login methods (SAML, OAuth, OpenID Connect) with supported flows, token endpoint URIs, and security requirements, allowing clients to negotiate the optimal authentication method rather than probing services piecemeal.

Secure Feeds: For partners, regulators, or large-scale consumers, the DA may export signed bundles of service information over HTTPS feeds, message queues, or push notifications. These feeds carry richer metadata and can be cryptographically signed with the domain's DNSSEC keys for authenticity and integrity. An example secure feed might look like:

```
["domain": "example.com", "generated_at". "...",
  "services": [{"name": "auth", "endpoints": [{
      "protocol": "OIDC",
      "url": "https://login.example.com/.well-known/openid-configuration",
      "metadata": {
        "supported_flows": ["authorization_code", "client_credentials"],
        "token_endpoint_auth": "private_key_jwt"}
    }] },
  {"name": "payments", "endpoints": [{
      "protocol": "ISO20022",
      "url": "https://pay.example.com/api/v2",
      "metadata": {
        "currencies": ["USD", "EUR"],
        "throughput": "500 tx/sec",
        "cert_expiration": "..." }
    }] } ],
  "signature": "Base64EncodedSignature=="]
```

Through this multi-channel model, embodiment of DA ensure consistency across legacy DNS consumers, modern API-driven applications, and specialized high-assurance consumers. Legacy mail servers or SIP clients continue to resolve SRV and MX records, while SaaS integrations and regulators subscribe to signed service feeds with richer metadata. Crucially, all channels can be generated from the same authoritative source with DNSSEC signing, ensuring coherence and authenticity regardless of the distribution method. FIG. 16 depicts this multi-channel model of service delivery.

This architecture enables incremental adoption of new service protocols. For instance, a domain can introduce a new ISO 20022 payment API via secure feeds and DA APIs while continuing to publish ISO 8583 endpoints via DNS, allowing consumers to transition at their own pace. By bridging static DNS and dynamic API ecosystems, the DA transforms service management from fragmented, error-prone updates into a unified, authoritative framework that accelerates adoption of new Internet features.

7. Embodiment: Certificate Management

Public key certificates enable encrypted connections and authenticated services, but certificate lifecycle management remains complex when integrating with DNS. DANE and TLS Authentication (TLSA) records allow domains to bind certificates directly to services, but are difficult to maintain due to large record sizes and frequent rotation requirements. Similarly, Automatic Certificate Management Environment (ACME) certificate issuance requires temporary DNS challenges that often remain as "litter," while Certificate Authority Authorization (CAA) records must be carefully configured to avoid blocking valid issuances.

In one embodiment, the DA serves as the authoritative manager for certificate-related policies and records. The DA automates TLSA record generation with correct cryptographic parameters, synthesizes CAA policies from administrator inputs, and manages ACME domain control validation workflows by publishing challenge tokens, monitoring completion, and automatically removing them to prevent DNS clutter. As opposed to fragmented approaches where certificate management spans multiple tools and DNS entries, the DA can provide unified authority that ensures TLSA records align with actual service certificates, CAA policies reflect current authorization requirements, and ACME challenges execute securely without exposing certificate issuance practices.

The DA publishes standard DNS records (TLSA, CAA) for compatibility while simultaneously distributing enriched certificate metadata via APIs—including expiration dates, supported TLS versions, and compliance certifications. When certificates rotate, the DA updates TLSA records, CAA policies, and API responses atomically, ensuring a coherent state across all distribution channels with DNSSEC signing for cryptographic validation. This coordinated lifecycle management eliminates the inconsistencies that occur when certificate data is managed through separate systems.

For example, when a new TLS certificate is deployed for mail.example.com, the DA extracts its public key, generates the appropriate TLSA record (e.g., 3 1 1<SHA-256 hash of public key>), and publishes it alongside the certificate endpoint. Simultaneously, it updates the domain's CAA record to list the authorized certificate authority. For issuance through ACME, the DA publishes the required acme-challenge.example.com TXT record, monitors the CA's validation query, and automatically deletes the record once validation is complete, preventing long-lived clutter. During certificate rotation, the DA temporarily publishes both the old and new TLSA records to allow relying parties to validate against either certificate until the switchover is confirmed, at which point the old record is retired.

API responses bundle this same information with certificate metadata, such as expiration date and supported TLS versions, ensuring external consumers can validate the current state atomically across all channels. FIG. 17 shows a DA embodiment that unifies certificate lifecycle management: automating TSLA, CAA, and ACME workflows, publishing DNS records for compatibility while delivering rich metadata via APIs and secure feeds.

By consolidating TLSA, CAA, and ACME workflows under domain-level authority, the DA transforms these underutilized security mechanisms into practical deployment tools. The unified approach prevents DNS clutter, enables atomic certificate validation, and provides consistent cryptographic assurance across DNS and API channels-accelerating adoption of stronger certificate practices that fragmented management approaches cannot achieve.

8. Embodiment: DA-Implemented Honeypot

Traditional honeypot deployments require separate infrastructure, custom monitoring systems, and isolated management, which makes them difficult to integrate with legitimate domain services. Attackers can often identify honeypots through inconsistent configurations, missing cross-references, or a lack of authoritative domain integration, which reveals their deceptive nature.

The DA enables comprehensive honeypot orchestration by leveraging its unified authority to create convincing decoy domain infrastructure. A security administrator can register decoy devices, services, capabilities, and identities that appear fully integrated with legitimate domain resources—decoy payment gateways with corresponding device registrations, decoy administrative accounts with realistic permission profiles, and non-existent services advertised through both DNS records and API responses. The DA's cross-category validation ensures honeypot consistency: fake services reference registered honeypot devices, deceptive capabilities align with advertised endpoints, and decoy identities possess appropriate policy permissions.

Isolated honeypots often appear suspicious through inconsistent DNS records or missing cross-references. DA-managed honeypots benefit from the same multi-channel distribution as legitimate resources. Attackers performing reconnaissance encounter consistent information across DNS lookups and API queries, with DNSSEC-signed responses providing cryptographic verification that the information authentically originates from the domain authority. This makes honeypot services indistinguishable from legitimate offerings through external analysis. High-value honeypots can be selectively distributed—authenticated API queries may reveal sensitive administrative endpoints while public DNS queries omit them, enabling graduated exposure that supports attack progression tracking and behavioral analysis.

The DA's built-in telemetry system naturally captures all honeypot access attempts with detailed attribution data—which attackers queried specific fake services, how they discovered honeypot endpoints, and their progression patterns across the deceptive infrastructure. This integrated monitoring correlates attacks across multiple honeypot categories, enabling security teams to track sophisticated adversaries moving from external reconnaissance (DNS queries for fake services) to internal access attempts (API queries for administrative endpoints) to credential usage (authentication attempts against decoy identities). The DA maintains complete audit trails for forensic analysis while enabling dynamic honeypot adjustment based on threat intelligence.

Below are some illustrative example honeypots that can be implemented by embodiments of DA, possibly implemented as cartridges for a chassis-based DA:

SIP Honeypot: A domain administrator may configure the DA to expose a deceptive SIP service. The DA generates a valid SRV record (e.g., sip._tcp.example.com 10 60 5060 honeypot.example.com) signed with the domain's DNSSEC keys and simultaneously creates an API entry advertising the same service with plausible metadata. No actual SIP server exists at the target endpoint, but the DA monitors all connection attempts and records telemetry, including the source IP, query path, and attempted credentials. Because the honeypot SRV record is cryptographically signed under the domain's authority, external reconnaissance tools cannot easily distinguish it from legitimate services.

Payment Honeypot: A domain administrator may register a deceptive payment gateway as part of its authoritative service catalog. An administrator configures a honeypot endpoint such as pay.example.com with metadata indicating ISO 20022 compliance and TLS enforcement. The DA generates the corresponding DNS A and SRV records signed with DNSSEC, while also publishing enriched API metadata (e.g., accepted currencies, supported protocols). No actual payment processing service exists at the endpoint, but all inbound connection attempts are logged by the DA's telemetry subsystem. Because the honeypot records are consistent across DNS and API channels, attackers conducting reconnaissance for payment systems perceive the endpoint as authentic until they attempt transactions, enabling attribution and behavioral analysis without exposing live systems.

OAuth Honeypot: A domain administrator advertises a deceptive OAuth 2.0 authorization server under login.example.com. The DA publishes standard DNS A records for the endpoint and creates API responses that mimic OAuth discovery metadata at the .well-known/OAuth-authorization-server endpoint, indicating client registration capabilities, supported grant types, and token endpoints. These responses may be signed with DNSSEC and validated through the DA's authority, making them indistinguishable from legitimate authentication infrastructure. Attackers probing the OAuth service may attempt credential stuffing, authorization code interception, or client registration—all of which are captured by the DA's telemetry. The DA can selectively expose such honeypot endpoints internally or externally, enabling security teams to trace adversary movements from reconnaissance queries to attempted logins under a controlled, monitored environment.

Self-Protection Honeypots: Because the Domain Authority (DA) itself is a high-value target, embodiments may incorporate honeypot techniques directly into the DA's administrative and API surfaces to detect and deter attacks. For example, the DA may expose deceptive administrative endpoints, API tokens, or management consoles that appear authentic but are segregated from actual control paths. To unauthorized reconnaissance tools, these honeypot interfaces are formatted and presented with the same cryptographic rigor as legitimate assets, making them indistinguishable at the protocol level, while internally they are flagged as deception objects and excluded from authoritative datasets consumed by trusted clients. The DA's telemetry subsystem monitors and records all honeypot interactions, providing early warning of targeted attacks and enabling forensic correlation. Because the DA already consolidates domain-wide telemetry and distribution, events captured at the DA honeypot layer can be analyzed alongside activity from external honeypots (e.g., deceptive services or devices) to detect coordinated reconnaissance or intrusion campaigns. In this way, honeypot orchestration strengthens rather than weakens the DA's trust model: legitimate clients receive only authoritative data, while attackers are diverted into realistic but isolated deception channels. This multi-layered approach protects both the domain's resources and the DA's own authority functions.

FIG. 18A illustrates how a DA can set up honeypots that provide a consistent view of services, resources, and identities to an attacker through DNS, APIs, and DNSSEC signatures. As the attacker attacks the honeypots, believing them to be true, FIG. 18B shows how the Honeypot Monitor can profile the attacker and gather telemetry for forensic analysis.

9. Embodiment: Zero-Trust Domain

Traditional perimeter-based security models rely on implicit trust once an entity is "inside" a network. Zero Trust Architecture (ZTA) eliminates this assumption, requiring continuous verification of every device, service, identity, and policy before granting access to domain resources. In one embodiment, the DA serves as the central trust anchor for implementing Zero Trust at the domain level. In contrast to application-centric ZTA platforms, the DA inherits domain trust through DNS designation, enabling enforcement that is both domain-wide and cryptographically verifiable.

Domain-Anchored Trust Enforcement: The DA ties access decisions directly to the domain namespace, ensuring that entities—device, service, or identity—are registered and validated under domain authority before use. For example, a device completes a cryptographic proof-of-control workflow; a service is registered against known devices and aligned with declared capabilities; and an identity possesses appropriate role-based permissions in the DA's registry. Policies governing access are evaluated atomically, enforcing encryption requirements, compliance mandates, and role restrictions consistently across categories.

Continuous Validation and Dynamic Enforcement: Unlike static DNS or isolated configuration systems, the DA embodiment for a ZTA domain enforces continuous, cross-category validation. Devices update status through heartbeat messages; services are checked against compliance requirements; identities are re-verified on each access attempt; and policies are enforced in real time. Telemetry-driven feedback enables dynamic adjustments—for instance, revoking access for a device reporting outdated patch levels or restricting a service endpoint during a detected anomaly.

Adaptive Access Control: In some embodiments, the DA supports rapid policy changes without DNS propagation delays. For example, during a suspected intrusion, the DA may temporarily restrict a payment gateway to credentialed API consumers only, hiding it from public service discovery while maintaining business continuity for authorized partners. Because these restrictions flow from the DA's authoritative distribution channels, adjustments take effect rapidly and consistently across DNS, APIs, and secure feeds.

Cartridge-Based Enforcement: Zero Trust enforcement may be implemented through DA cartridges that operate under the chassis's unified trust model. An Access Control cartridge enforces device-service-identity-policy relationships in real time; an Identity Management cartridge governs service accounts and API keys; a Compliance cartridge publishes and enforces regulations such as HIPAA or GDPR; and a Telemetry cartridge captures access attempts, anomalies, and forensic data. These cartridges allow domains to extend Zero Trust enforcement incrementally while preserving unified authority.

Multi-Domain Federation: In federated environments, DA-to-DA channels enable Zero Trust enforcement across organizational boundaries. A parent domain (corp.example.com) may authenticate and exchange service catalogs, policies, and identity permissions with a subsidiary domain (eu.example.com), using mutual credential verification. This coordinated governance extends Zero Trust from single domains to federated ecosystems such as multinational enterprises or supply chain networks.

Evidence-Based Trust Decisions: The DA's telemetry subsystem provides visibility into domain usage patterns—API logs show which identities accessed which services, device telemetry tracks operational health, and policy logs record enforcement decisions. This evidence enables adaptive trust decisions, rollback of faulty rules, and automated compliance reporting. While DNS provides no feedback beyond resolver queries, the DA establishes a closed-loop trust system anchored at the domain level.

Software Supply-Chain Validation: The DA's zero trust model extends to software supply chain validation through domain-anchored code signing and cross-organizational verification. Development identities registered with dev.example.com can be validated by production systems at prod.example.com through DA-to-DA channels. Through multi-domain federation, software components from trusted partner domains can be validated against their respective DA-issued signing certificates. Policies enforced through the DA's cross-category validation ensure that software deployment decisions align with organizational trust relationships, requiring that external software components be digitally signed by verified developers from authorized domains. This also avoids the need for centralized third-party certificate authorities by leveraging DNS/DA-issued certificates under existing domain trust.

FIG. 19 provides a pictorial depiction of a DA embodiment supporting a Zero Trust Domain. 1902, 1904, 1906, and 1908 represent devices, services, identities, and policies associated with the DA and the domain it controls. All access requests are funneled through cross-validation checks 1910, which enforce proof-of-control, compliance, RBAC, and policy alignment at every interaction. 1912 illustrates an attempted intrusion that is blocked by the DA at the validation layer, demonstrating dynamic policy enforcement and real-time containment. DAp represents a DA that controls a partner domain (or subdomain), which manages its own resources while participating in federated policy catalogs (1908). This federation allows domains to securely share selected service or identity permissions under mutual validation, enabling coordinated Zero Trust enforcement across organizational boundaries.

By consolidating Zero Trust enforcement under DNS-designated authority, the DA transforms the domain into an active trust anchor, capable of making fine-grained, real-time access decisions. This approach replaces brittle perimeter defenses with cryptographically verifiable, domain-wide trust enforcement that extends naturally across federated ecosystems.

10. Embodiment: Delegable and Revocable Subdomain Trust Anchors

Traditional DNS delegation relies on NS records to transfer control of a subdomain (e.g., sub.example.com) to another name server. This model is coarse-grained, difficult to monitor, and slow to revoke: revocation requires manual changes and propagation delays determined by time-to-live (TTL) values, often leaving stale delegations exploitable for hours or days.

In one embodiment, the Domain Authority (DA) introduces a system of delegable and revocable subdomain trust anchors that operate in parallel with traditional NS delegation but provide fine-grained, cryptographically verifiable, and instantly revocable delegation. A parent domain's DA issues a signed trust anchor for a subdomain, explicitly authorizing it under the parent's authority. Each trust anchor may include metadata such as:

Scope of delegation: specifying which categories (devices, services, capabilities, identities, policies) the subdomain is authorized to manage.

Time-bound validity: expiration dates, renewal requirements, or short-lived authorizations.

Policy constraints: cryptographic algorithm requirements, geographic restrictions, or compliance mandates (e.g., GDPR).

Discovery and Validation: Subdomain trust anchors are published via multiple channels. For legacy compatibility, minimal anchor information may be exposed in DNS TXT records. For full validation, signed trust anchors are distributed through DA APIs or secure feeds. DA-aware clients validate the chain of delegation cryptographically, while traditional resolvers continue to function via standard NS record delegation.

Hierarchical Delegation: Subdomain trust anchors can themselves issue signed delegations to further subdomains, forming a cryptographic chain of authority. Unlike TTL-dependent NS records, revocation is immediate: the parent DA can withdraw or replace an anchor, with updated state instantly propagated through DNS, APIs, and secure feeds.

Security Benefits: This model closes a longstanding DNS vulnerability: stale or hijacked NS delegations. By tying delegation to cryptographically signed trust anchors with rapid revocability, domains can prevent persistence of compromised subdomain delegations and ensure that only explicitly authorized subdomains remain valid at any point in time.

Example Implementation: A DA at example.com delegates eu.example.com to a European subsidiary by issuing a signed trust anchor. The anchor specifies GDPR compliance requirements and limits delegation scope to customer-facing services. The trust anchor is exposed through DNS TXT records and DA APIs. If the subsidiary is compromised, the parent DA revokes the trust anchor, quickly invalidating eu.example.com across all distribution channels without waiting for TTL expiry.

FIG. 20 shows how the DA supports delegation and revocation of domain authority through a subdomain hierarchy. In contrast to the traditional DNS delegation model with NS records, DAs can delegate and revoke subdomain authority and privileges through cryptographic verification and without TTL delays.

By replacing static, TTL-governed subdomain delegation with a policy-driven, cryptographically verifiable, and instantly revocable trust framework, the DA ensures that delegation operates at Internet speed while maintaining backward compatibility with existing DNS infrastructure.

11. Incremental Adoption and Innovation Enablement

The static nature of DNS has historically made it difficult to deploy new protocols, as new features must be standardized, supported by resolvers, and adopted end-to-end before becoming practical. Many Internet security improvements (DNSSEC, DANE, MTA-STS, BIMI) have seen slow adoption due to this "all-or-nothing" deployment barrier.

The DA overcomes this limitation by providing a flexible bridge between legacy DNS and modern distribution channels. New features can be distributed via API channels to early adopters before formal standardization—for example, post-quantum identity protocols via DA APIs while maintaining traditional S/MIME records in DNS. Once adoption grows, the DA automatically synthesizes DNS-compatible records for backward compatibility, enabling staged deployment that avoids ecosystem disruption.

The DA can simultaneously publish multiple protocol versions, ensuring smooth transitions. A domain migrating from SPF to DMARC can publish both policies, allowing relying parties to validate under either standard. Payment services can advertise legacy ISO 8583 and modern ISO 20022 endpoints in parallel, enabling consumer choice without breaking existing integrations. Similarly, API evolution can be managed incrementally: the DA may expose v1, v2, and v3 endpoints simultaneously, publishing deprecation timelines and metadata so that legacy clients continue to function while newer clients adopt enhanced versions. The DA's telemetry functions provide usage statistics to guide migration timing and measure adoption rates across features.

For example, a DA may publish a JSON API bundle declaring support for a new authentication method (e.g., OIDC), while continuing to serve SAML endpoints via DNS SRV records. Once adoption reaches a configured threshold based on telemetry, the DA synthesizes an OIDC SRV record for DNS publication, maintaining both formats until full transition.

This approach repositions domains as active participants in Internet innovation and has the potential to transform the Internet from a brittle configuration layer into a platform for continuous protocol evolution without requiring universal ecosystem coordination.

12. Example Use Cases

The Domain Authority (DA) can be deployed across a range of organizational scales. For small or new domains, the domain registrars may provide preconfigured DAs with DNSSEC keys and baseline policies through wizard-based setup, enabling secure defaults without requiring DNS record editing. Large enterprises can consolidate multi-party policy inputs—IT operations managing SRV records, compliance setting security rules, and marketing contributing BIMI policies—under a single authoritative system. Managed hosting providers can embed DA functionality to automatically provision DNSSEC keys and signed records for tenant domains, accelerating security deployment at scale. The DA's API channels also enable authenticated delivery of information unsuited to DNS, such as outage notifications, maintenance schedules, or compliance attestations.

13. Implementation Considerations

The DA can be implemented as software services on domain-controlled servers, embedded systems integrated into network infrastructure (routers, firewalls, security gateways), or hybrid deployments where key management operates in hardware security modules while administrative interfaces run in software. The DNS designation of the DA is protocol-agnostic—while typically using HTTPS for administration, the DA may communicate via gRPC, MQTT, or message queues depending on deployment requirements. Scalability is achieved through replication, distributed caching, and adaptive caching policies that differ from static DNS TTL values, using pre-signed bundles with validity periods or API-driven cache control headers to handle Internet-scale query volumes. In hybrid deployments, the DA may isolate cryptographic signing functions in an HSM while exposing administrative GUIs and APIs in software services, ensuring that private keys never leave hardware boundaries.

While described primarily at the top-level domain, the DA model is equally applicable at any level of the domain hierarchy. A parent DA (e.g., for example.com) may manage information across all subdomains, ensuring consistent policies and validations, or individual subdomains (e.g., cu.example.com, research.example.com) may designate their own independent DAs via DNS records. This flexibility allows organizations to balance centralized control with delegated autonomy, while still providing a consistent mechanism for external consumers to discover and validate domain-related information.

14. Future Directions

Section 3 described the DA's core cycle of collection, validation, storage, distribution, and telemetry. Future embodiments may layer additional management, diagnostic, and optimization functions atop this foundation. Examples include:

Dynamic threat response: Adjust service visibility or policy enforcement in real time based on telemetry and integrated threat feeds.

Cross-functional diagnostics: Correlate logs and configuration states across devices, services, and policies and federated subdomains to reveal systemic anomalies.

Multi-domain federation: Coordinate policies and trust relationships between related domains (e.g., subsidiaries or supply-chain partners) via DA-to-DA channels.

API ecosystem management: automatically generating and maintaining client SDKs, documentation, and integration guides based on the DA's service and capability catalog.

Digital Twin Metadata Authority: Serve as the authoritative publisher of device state and lifecycle metadata, with cross-domain trust supported through DNSSEC to act as a metadata authority for digital twins.

Regulatory compliance automation: generating compliance reports (e.g., GDPR, HIPAA, SOX) by correlating device, service, and identity against regulatory requirements.

Intra-domain communication: under federated environments, DAs may exchange administrative information, such as security threat intelligence, with communications cryptographically signed under the domain authority. For example, email domains can share spam signatures and malicious sender data through authenticated DA-to-DA channels, ensuring threat intelligence originates from verified domain sources.

While the DA gains much of its value by inheriting a domain's trust through DNS, the same principles apply within private namespaces. A Virtual Network Directory Authority (VNDA) can unify discovery, policy enforcement, and identity management inside intranets, data centers, or multi-cloud environments, with features such as zero-trust enforcement, device inventory, private SRV discovery, and insider threat detection.

The invention claimed is:

1. A system comprising one or more Internet-connected servers including one or more processors coupled to non-transitory computer-readable storage media storing program instructions that, when executed by the one or more processors, cause the one or more Internet-connected servers to implement a Domain Authority (DA) for an Internet domain, wherein:

the DA is designated by the Internet domain, via a Domain Name System (DNS) record stored in at least one authoritative DNS server for the Internet domain, as an authoritative source of domain-related information for the Internet domain, the DNS record comprising a predetermined type indicator identifying the DNS record as a DA locator record and a value identifying a network location for accessing the DA; and the DA comprises:

a collection interface configured to receive domain-related information from authorized administrators and automated systems, the domain-related information received by the collection interface belonging to a plurality of categories of domain resources associated with the Internet domain, wherein the plurality of categories comprises at least three of:

devices associated with the Internet domain;

services provided by the Internet domain;

capabilities offered by the Internet domain;

identities acting on behalf of the Internet domain; and policies governing access to resources of the Internet domain;

a validation engine configured to perform cross-category consistency validation on at least the domain-related information received by the collection interface, the cross-category consistency validation comprising:

enforcing one or more cross-category consistency rules on at least the domain-related information received by the collection interface, wherein the cross-category consistency rules specify predefined relationships between domain-related information belonging to different categories of the plurality of categories; and identifying a given item of domain-related information as validated if the given item does not violate any of the one or more cross-category consistency rules; and a distribution interface configured to distribute, via one or more distribution channels, at least one item of domain-related information identified as validated to requesting parties.

2. The system of claim 1, wherein the distribution interface is configured to:

distribute domain-related information via DNS records; and distribute, via application programming interfaces (APIs), domain-related information with additional metadata.

3. The system of claim 1, wherein the one or more cross-category consistency rules comprise a rule specifying that domain-related information for a service of the services provided by the Internet domain is identified as inconsistent if the service references any device that does not belong to the category of devices associated with the Internet domain.

4. The system of claim 1, wherein the one or more cross-category consistency rules comprise a rule specifying that domain-related information for a capability of the capabilities offered by the Internet domain is consistent only if at least one policy of the policies governing access to resources of the Internet domain authorizes the capability and the capability does not violate any constraint specified in that policy.

5. The system of claim 1, wherein the one or more cross-category consistency rules comprise a rule specifying that domain-related information for an identity of the identities acting on behalf of the Internet domain is consistent only if, for each device of the devices associated with the Internet domain and each service of the services provided by the Internet domain that the identity is configured to operate, the identity is designated as authorized to operate that device or service.

6. The system of claim 1 further configured to perform cryptographic proof-of-control validation on domain-related information received from at least one automated system.

7. The system of claim 6, wherein the cryptographic proof-of-control validation comprises:

issuing a cryptographic challenge to the at least one automated system; and verifying a signed response from the at least one automated system to the cryptographic challenge using a credential registered with the DA.

8. The system of claim 1, wherein the DA further comprises a storage component configured to maintain, for the Internet domain, an authoritative repository of domain-related information that has been identified as validated by the cross-category consistency validation.

9. The system of claim 8, wherein at least one of the one or more distribution channels is configured to distribute, to the requesting parties, domain-related information derived at least in part from validated domain-related information stored in the authoritative repository.

10. The system of claim 1, wherein the DA implements a chassis-cartridge architecture comprising:

a chassis component configured to provide common services including authentication, DNS integration, and secure storage; and one or more cartridge components, each cartridge component configured to implement category-specific collection, validation, and distribution logic for one or more of the plurality of categories of domain resources.

11. The system of claim 1, wherein the Internet domain is secured using Domain Name System Security Extensions (DNSSEC), and wherein the DA is configured to generate a DNSSEC signature record that cryptographically authenticates the DA locator record.

12. The system of claim 1, wherein the DA is further configured to digitally sign a DNS record for at least one subdomain of the Internet domain using a DNSSEC zone-signing key corresponding to the at least one subdomain, wherein services provided by the at least one subdomain are implemented by an external service provider.

13. The system of claim 12, wherein the DA is further configured to revoke trust for at least one subdomain of the Internet domain by causing the removal, from an authoritative DNS zone for the Internet domain, of at least one DNSSEC record that forms part of a cryptographic chain of trust for the at least one subdomain.

14. The system of claim 1, wherein the DA is configured to:

cause removal or deactivation, in an authoritative DNS zone for the Internet domain, of one or more DNS records that advertise services of the Internet domain; and distribute, via an API distribution channel, domain-related information to authenticated clients notwithstanding the removal or the deactivation of the one or more DNS records.

15. The system of claim 1, wherein the distribution interface is further configured to distribute domain-related information identified as validated to registered callback endpoints via webhook notifications.

16. The system of claim 1, wherein the services provided by the Internet domain include a honeypot service, wherein domain-related information associated with the honeypot service identifies the honeypot service as a decoy endpoint, and wherein access requests directed to the decoy endpoint are handled according to a honeypot policy.

17. The system of claim 2, wherein the distribution interface further comprises an authenticated access channel configured to provide, to authenticated clients, domain-related information including additional metadata or control operations that are not exposed via non-privileged distribution channels.

18. The system of claim 1, wherein the DA is further configured to record telemetry data capturing one or more operations performed by the DA.

19. A computer-implemented method performed by a Domain Authority (DA) that serves as an authoritative source of domain-related information for an Internet domain, the method comprising:

receiving, via a collection interface of the DA, domain-related information from authorized administrators and automated systems, the domain-related information received by the collection interface belonging to a plurality of categories of domain resources associated with the Internet domain, wherein the plurality of categories comprises at least three of:

devices associated with the Internet domain;

services provided by the Internet domain;

capabilities offered by the Internet domain;

identities acting on behalf of the Internet domain; and policies governing access to resources of the Internet domain;

performing, via a validation engine of the DA, cross-category consistency validation on at least the domain-related information received by the collection interface, the cross-category consistency validation comprising:

enforcing one or more cross-category consistency rules on at least the domain-related information received by the collection interface, wherein the cross-category consistency rules specify predefined relationships between domain-related information belonging to different categories of the plurality of categories; and identifying a given item of domain-related information as validated if the given item does not violate any of the one or more cross-category consistency rules; and distributing, via a distribution interface of the DA, at least one item of domain-related information identified as validated to requesting parties, wherein the DA is designated by the Internet domain via a Domain Name System (DNS) record stored in at least one authoritative DNS server for the Internet domain, as the authoritative source of domain-related information for the Internet domain, the DNS record comprising a predetermined type indicator identifying the DNS record as a DA locator record and a value identifying a network location for accessing the DA.

20. A non-transitory computer-readable medium storing program instructions that, when executed by one or more processors of one or more Internet-connected servers, cause the one or more processors to implement a Domain Authority (DA) that serves as an authoritative source of domain-related information for an Internet domain and to:

receive, via a collection interface of the DA, domain-related information from authorized administrators and automated systems, the domain-related information received by the collection interface belonging to a plurality of categories of domain resources associated with the Internet domain, wherein the plurality of categories comprises at least three of:

devices associated with the Internet domain;

services provided by the Internet domain;

capabilities offered by the Internet domain;

identities acting on behalf of the Internet domain; and policies governing access to resources of the Internet domain;

perform, via a validation engine of the DA, cross-category consistency validation on at least the domain-related information received by the collection interface, the cross-category consistency validation comprising:

enforcing one or more cross-category consistency rules on at least the domain-related information received by the collection interface, wherein the cross-category consistency rules specify predefined relationships between domain-related information belonging to different categories of the plurality of categories; and identifying a given item of domain-related information as validated if the given item does not violate any of the one or more cross-category consistency rules; and distribute, via a distribution interface of the DA, at least one item of domain-related information identified as validated to requesting parties, wherein the DA is designated by the Internet domain via a Domain Name System (DNS) record stored in at least one authoritative DNS server for the Internet domain, as the authoritative source of domain-related information for the Internet domain, the DNS record comprising a predetermined type indicator identifying the DNS record as a DA locator record and a value identifying a network location for accessing the DA.

\* \* \* \* \*